(12) United States Patent
Shigeta

(10) Patent No.: US 6,771,278 B2
(45) Date of Patent: Aug. 3, 2004

(54) IMAGE PROCESSING SYSTEM, IMAGE DISPLAY METHOD, RECORDING MEDIUM AND IMAGE DISPLAY APPARATUS

(75) Inventor: Kazuyuki Shigeta, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 258 days.

(21) Appl. No.: 09/955,205

(22) Filed: Sep. 19, 2001

(65) Prior Publication Data

US 2002/0089518 A1 Jul. 11, 2002

(30) Foreign Application Priority Data

Sep. 22, 2000 (JP) .......................................... 2000-289207
Sep. 6, 2001 (JP) .......................................... 2001-270486

(51) Int. Cl.[7] .............................................. G09G 5/377
(52) U.S. Cl. ........................................ 345/634; 345/625
(58) Field of Search ................................ 345/634, 635, 345/637, 625, 626, 627, 628

(56) References Cited

U.S. PATENT DOCUMENTS 5,351,067 A * 9/1994 Lumelsky et al. .......... 345/637

2002/0175924 A1 * 11/2002 Yui et al. .................... 345/660

OTHER PUBLICATIONS

Matin Webb, Introduction to JavaScript Pop–up Windows, Nov. 9, 1998, http://tech.irt.org/articles/js128/.*

* cited by examiner

Primary Examiner—Jeffery Brier
(74) Attorney, Agent, or Firm—Fitzpatrick, Cella, Harper & Scinto

(57) ABSTRACT

An image display system comprises a plurality of image signal sources adapted to respectively transmit image signals and pieces of display area information specifying the display areas of the respective images represented by the image signals and an image display apparatus adapted to display the images on its display section according to the transmitted pieces of display area information. The image display apparatus has a determining section for determining the presence or absence of an overlapping area on the display section on the basis of the pieces of display area information transmitted from the image signal sources and an erasing section for erasing the image signal of the image to be displayed behind the other image for the overlapping area as determined to exist by the determining section.

15 Claims, 12 Drawing Sheets

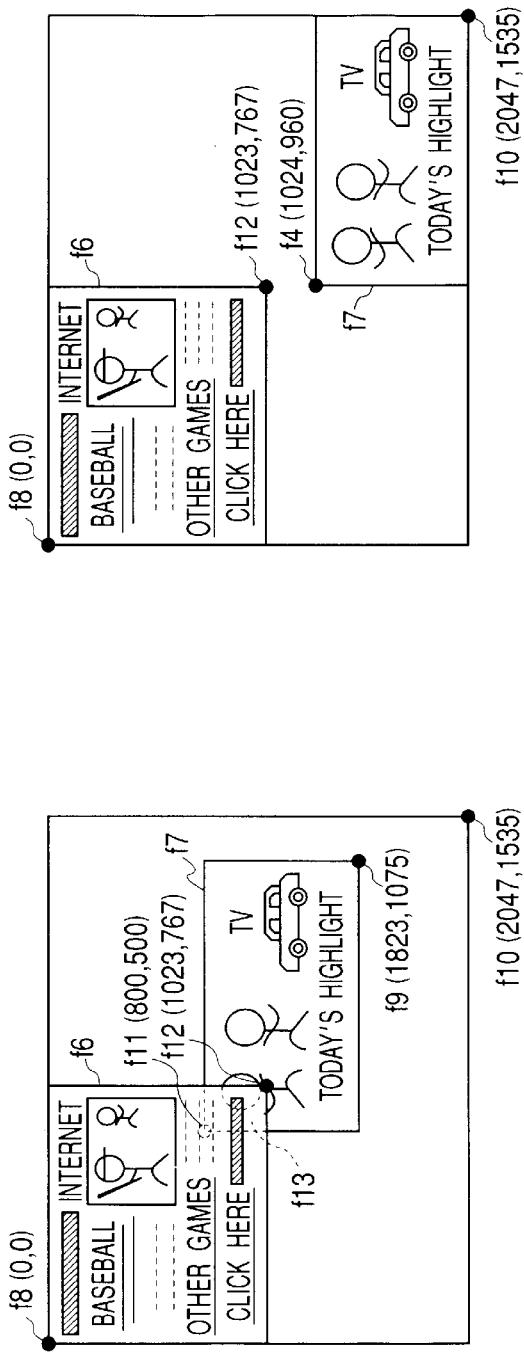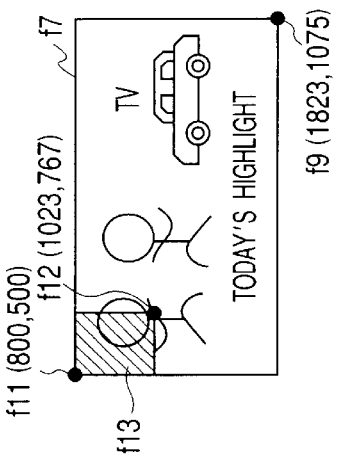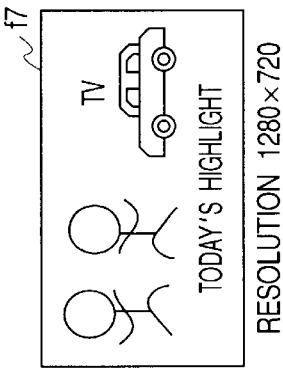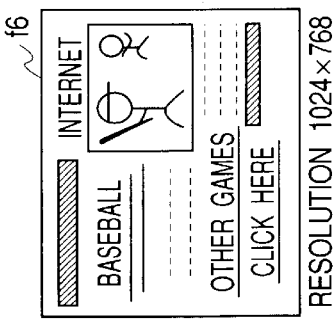

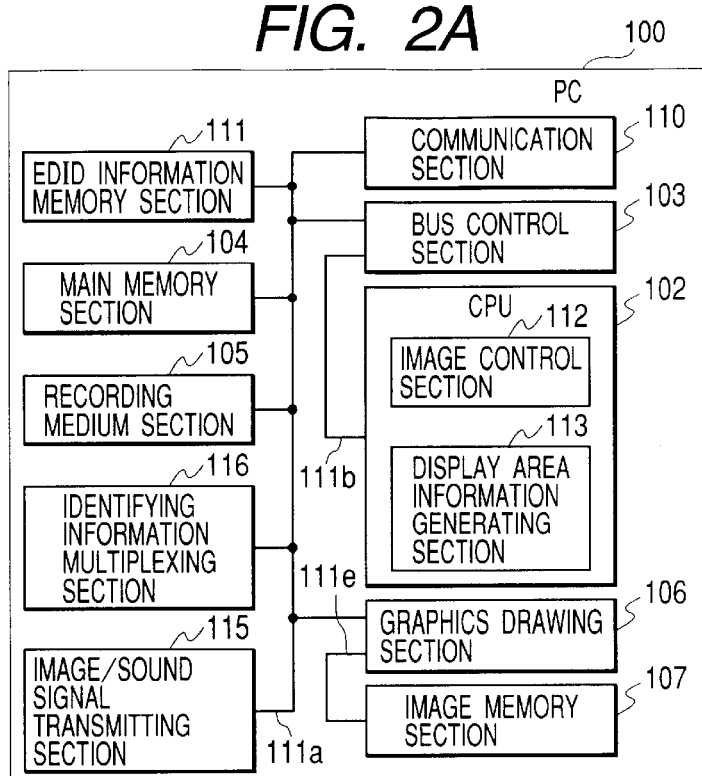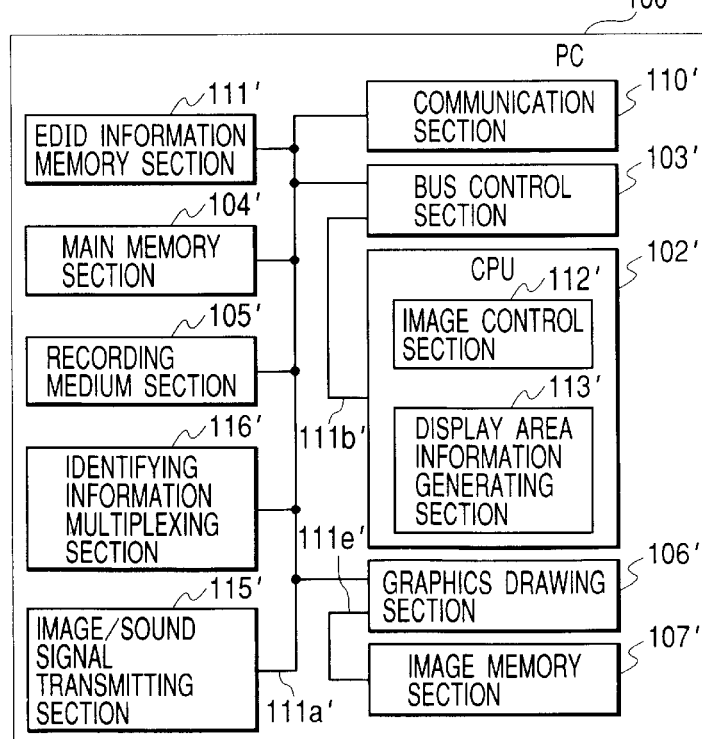

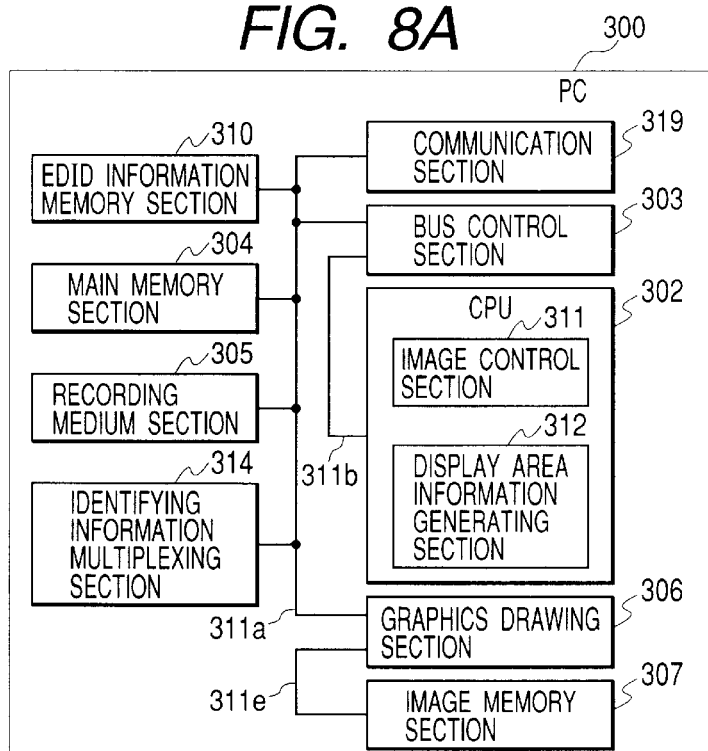
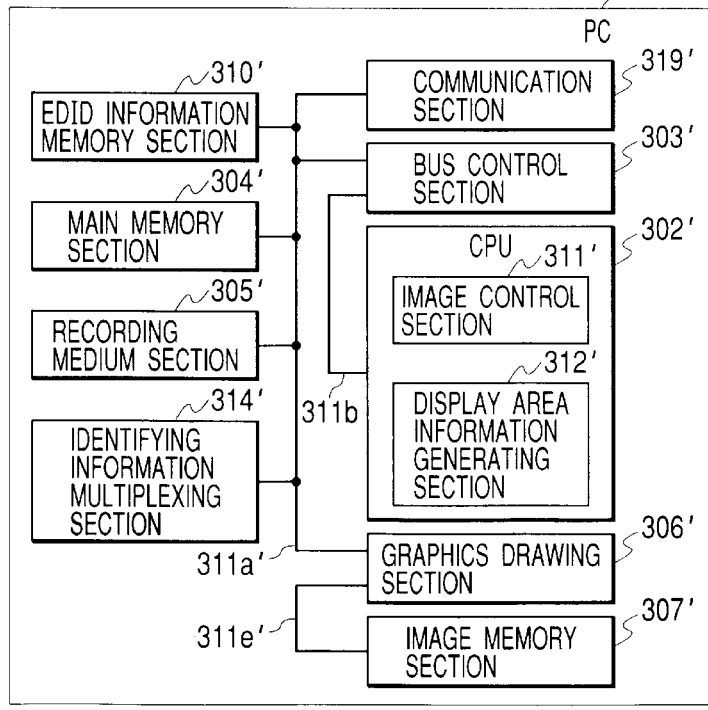
FIG. 8A
FIG. 8
| FIG. 8A | FIG. 8B |

IMAGE PROCESSING SYSTEM, IMAGE DISPLAY METHOD, RECORDING MEDIUM AND IMAGE DISPLAY APPARATUS

BACKGROUND OF THE INVENTION

1. Field of the Invention

This invention relates to an image display system, an image display method and an image display apparatus and, more particularly, it relates to an image display system comprising a plurality of image signal sources and an image display apparatus.

2. Related Background Art

As a result of the development in the field of communication technologies in recent years, more and more communication networks are currently installed in offices. Printers, scanners and other electric devices are mutually connected by way of personal computers (to be referred to as PCs hereinafter) in many offices. Additionally, communication systems for connecting home electric devices such as HAVi (home audio/video interoperability) and Jini by means of networks have been standardized by IEEE (Institute of Electrical and Electronics Engineers, Inc.) 1394 and USB (Universal Serial Bus) to promote the utilization of such systems.

Furthermore, arrangements for transmitting video signals from a PC to a large screen plasma display or a large screen projector for the purpose of presentation and/or TV conferencing in order to allow access to various data are already in place in many offices. Similarly, arrangements for transmitting video signals from a DVD to a television set adapted for a wide screen (to be referred to as TV hereinafter) or a large screen rear projection TV for the purpose of showing films and home videos are also already in place in a number of homes.

Under these circumstances, TV monitors and PC displays are required to display images of the video signals output from electric devices connected thereto by way of networks. Recently, TV monitors and PC displays that are compatible with each other have been marketed so that an image transmitted from a PC now can be displayed on a TV monitor and vice versa.

FIG. 10 of the accompanying drawings schematically illustrates the internal configuration of a known popular image display system of the type under consideration. In FIG. 10, a PC 100 and a PC display 600 are connected to each other by way of transmission lines 114a, 114b.

The PC 100 comprises a DDC (display data channel) communication section 110 for receiving the video signal transmitted from the PC display 600, a main memory section 104 contained in the main body of the PC 100, a recording medium section 105 for storing information in and reproducing information from a recording medium that may be a hard disk, a graphics drawing section 106 for producing an image signal on the basis of the received video signal and various pieces of information stored in the main memory section 104 and the recording medium section 105, an image memory 107 which is used by the graphics drawing section 106 for producing an image signal, an image transmitting section 108 for transmitting the image signal produced from the graphics drawing section 106 to the PC display 600, a bus control section 103 for monitoring and controlling the data bus 111a connecting the above sections and a CPU (central processing unit) 102 for control the operation of the PC main body 100.

The PC 100 comprises a connection line 111b connecting the CPU 102 and the bus control section 103, a connection line 111c connecting the DDC communication section 110 and the graphics drawing section 106, a connection line 111d connecting the graphics drawing section 106 and the image transmitting section 108 and a connection line 111e connecting the graphics drawing section 106 and the image memory 107.

On the other hand, PC display 600 comprises an image receiving section 218 for receiving the image signal transmitted from the image transmitting section 108 and typically conforming to the TMDS Standards and converting its format into one adapted to processing the signal comprising 8-bit for each of the primary colors of RGB, a format converting section 219 for converting the format of the image signal from the image receiving section 218 in terms of resolution, frame frequency and so on in order to make the image signal match the number of display pixels of the main body of the PC display 600, an image memory section 220 to be used for converting the format of the image signal, an image processing section 221 for processing the format-converted image signal in terms of gamma characteristics and color characteristics, an image display section 222 typically comprising a liquid crystal display, a CRT, a PDP, an EL display or an LED display, a DDC for transmitting a video signal to the PC 100 and a microcomputer section 217 for controlling the main body of the PC display 600.

The microcomputer section 217 by turn comprises a resolution determining section 223 for receiving information (including the frequency and the polarity of the synchronizing signal) on the image signal received by the image receiving section 218, determining the resolution of the received image and transmitting a control signal to be used for converting the format of the image signal to the format converting section 219.

The PC display 600 additionally comprises a connection line 225b connecting the image receiving section 218 and the format converting section 219, a connection line 225e connecting the format converting section 219 and the image memory 220, a connection line 225c connecting the format converting section 219 and the image processing section 221, a connection line 225d connecting image processing section 221 and the image display section 222 and a data bus 225a connecting the microcomputer section 217 and the sections 218, 219, 221, 222 and 224.

As seen from FIG. 10, in the known popular image display system, the PC 100 and the PC display 600 are connected to each other not by means of a network but by way of transmission lines 114a, 114b to establish a 1 to 1 connection. Then, the image resolution is determined as a result of the exchange of EDID data between the DDC communication sections 224 and 110 that takes place when the PC is activated or in the operation of detecting the connection of the PC 100 and the PC display 600 so that the resolution is appropriately converted in the PC display 600 before displaying the image according to the input video signal.

It should be noted here that the PC is the host of the system and the PC display serves the host. For example, when the PC and the PC display determine the resolution of the image to be displayed, only a list of resolutions that can be used for displaying the image as defined in the Extended Display Identification Data Standard, Version 3, is transmitted from the PC display to the PC by DDC communication and the actual resolution is determined by the graphics drawing section of the PC after referring to the list. Then, the PC arbitrarily outputs the image signal with the determined resolution to the PC display. Therefore, the PC display has to find out the resolution from the transmitted image signal and perform an appropriate resolution converting operation on the input image signal. This process of determining the resolution by DDC communication is based on the fact that the PC controls the display area of the PC display as host. In short, known image display systems of the type under consideration are not adapted to connect a plurality of PCs and a PC display in such a way that images represented by the image signals transmitted from some or all of the PCs are simultaneously displayed on the PC display.

FIG. 11 is a schematic illustration of a system such as HAVi or Jini connecting a number of home AV devices and comprising an image display system as shown in FIG. 10.

Referring to FIG. 11, there are shown a public communication network 395, a modem 394 connected to the public communication network 395, IEEE 1394 hubs (HUBs) 387, 388 for sorting and delivering IEEE 1394 signals, various electric devices connected to the IEEE 1394 hubs 385, 386, 399, 313, 380, 391, 392 and a set top box (STB) connecting a digital television set 301 and the IEEE 1394 hub 307.

It should be noted here that digital television set 313 contains an IEEE 1394 decoder and hence is connected directly to the IEEE 1394 hub 388 without using a set top box.

In FIG. 11, there are also shown communication lines 17a through 17i conforming to the IEEE 1394 Standard and connecting the electric devices and the corresponding IEEE 1394 hubs 387, 388 and also mutually the IEEE 1394 hubs, a connection line 17j connecting the modem 394 and the IEEE 1394 hub 388, a connection line 16 which is typically a telephone line connecting the modem 394 and the public communication network 395, a cable 19 dedicated to images and having a D terminal connecting the set top box 382 and the digital television set 301 and cables 18b, 18a dedicated to images and connecting the PCs 380, 399 and the PC displays 309, 383 respectively.

The various electric devices shown in FIG. 11 include digital television sets (DTVs) 301, 313 adapted to receive digital broadcasts, a separate digital television tuner (DTV Tuner) 385, a digital video set (DV) 386, PCs 380, 399, PC displays 309, 383 connected to the respective PCs, a DVD player (DVD) 391 and a hard disk drive (HDD) 392 for recording broadcast programs.

Note that the PCs 380, 399, the PC displays 309, 383 and the cables 18b, 18a dedicated to images that are shown in FIG. 11 correspond respectively to the PC 100, the PC display 600 and the transmission lines 114a, 114b described earlier by referring to FIG. 10.

With the IEEE 1394 network illustrated in FIG. 11, the user can realize an environment where he or she can display images represented by respective image signals transmitted from some or all of the various electric devices 385, 386, 391, 392 on the display screens of the digital television sets 301, 313. Such a system can be realized because the digital television sets 301, 313 operate as hosts that use image signal sources including the DVD 391 and the DV 386 as slaves and control the operation of allocating the virtual display areas (e. g., channels and window positions of a multiple screen) of TVs to some or all of the image signal sources and hence the image signal sources do not have the right of specifying the respective display positions.

On the other hand, while the PCs 380, 399 are connected respectively to the IEEE 1394 hubs 388, 387, signal transmissions and receptions conforming to the IEEE 1394 Standard do not take place between the PCs 380, 399 and the respective PC displays 309, 383. In other words, the image signals from the DVD 391 and the DV 386 and those from the PCs 380, 399 cannot coexist on the network.

The above described known technology is not adapted to connect a plurality of PCs to a common image display apparatus and display the images represented by the image signals from the respective PCs on the display screen of the image display apparatus. Furthermore, it is not adapted to allow image signals from TV sets and those from PCs to coexist on the network.

However, the entire cost of the system will be high and resources will be wasted when the plurality of PCs of the system are provided with respective image displays as PC displays and image signals from the TVs and those from the PCs are not allowed to coexist on the network. Therefore, there will be a strong demand for a system where a plurality of PCs are connected to a single common image display apparatus so that the images represented by the image signals from various image signal sources including some or all of the PCs may be displayed on the display screen of the image display apparatus.

On the other hand, the inventor of the present invention have found that appropriate measures need to be taken when the images represented by the image signals from a pair of PCs are to be displayed on the display screen of an image display apparatus because, otherwise, the image signals from the pair of PCs coexist in the image memory in an disorderly fashion and the images can be displayed in an overlapping manner. Then, the overlapping areas of the images will flicker to severely damage the quality of the displayed images.

The inventor of the present invention tried to transmit only the data for the difference between a preceding image signal and a succeeding image signal for updating the preceding image signal by partially rewriting it in an attempt of reducing the volume of data to be transmitted as image signal by way of a communication network. As a result, the inventor of the present invention found that two image data indicating a same coordinate system are input alternately to a signal decoder to be used for the partial rewriting operation. The net result is that the image obtained and displayed on the display screen of an image display apparatus can be a disorderly mixture of two images because the decoding circuit for indicating the coordinate system does not operate properly. Therefore, it may not be possible to display the intended image with such a technique.

The above identified problem does not arise in a system where TV-related devices are connected because the TV set operates as host for displaying images. However, in the case of PC-related devices connected to a common display device, the display device cannot respond properly to the signals transmitted from a number of host devices and indicating the respective display attributes such as display coordinates particularly when the signals contain contradictory factors.

SUMMARY OF THE INVENTION

In view of the above identified circumstances, it is therefore the object of the present invention to realize a system where a plurality of image signal sources such as PCs are connected to a single and common image display apparatus and the image display apparatus can display the images represented by the image signals transmitted from some or all of the image signal sources in an orderly manner without disorderly mixing of the images.

In an aspect of the invention, there is provided an image display system comprising:

a plurality of image signal sources adapted to respectively transmit image signals and pieces of display area information specifying the display areas of the respective images represented by the image signals; and an image display apparatus adapted to display the images on its display section according to the transmitted pieces of display area information;

said image display apparatus having:

a determining section for determining the presence or absence of an overlapping area on the display section on the basis of said pieces of display area information transmitted from said image signal sources; and an erasing section for erasing the image signal of the image to be displayed behind the other image for the overlapping area as determined to exist by said determining section.

In another aspect of the invention, there is provided an image display system comprising:

a plurality of image signal sources adapted to respectively transmit image signals and pieces of display area information specifying the display areas of the respective images represented by the image signals; and an image display apparatus adapted to display the images on its display section according to the transmitted pieces of display area information;

said image display apparatus having:

a determining section for determining the presence or absence of an overlapping area on the display section on the basis of said pieces of display area information transmitted from the said image signal sources; and a processing section for processing either of the pieces of display area information of the images to be overlapping so as to eliminate the overlapping area as determined to exist by said determining section and display the images without overlapping.

In still another aspect of the invention, there is provided an image display method adapted to receive image signals and pieces of display area information specifying the display areas of the respective images represented by the image signals transmitted from a plurality of image signal sources by means of an image display apparatus and display said images on a display section of said image display apparatus according to the respective pieces of display area information, said method comprising:

a step of determining the presence or absence of an overlapping area on the display section on the basis of said pieces of display area information transmitted from said image signal sources; and a step of erasing the image signal of the image to be displayed behind the other image for the overlapping area as determined to exist by said determining section.

In still another aspect of the invention, there is provided an image display method adapted to receive image signals and pieces of display area information specifying the display areas of the respective images represented by the image signals transmitted from a plurality of image signal sources by means of an image display apparatus and display said images on a display section of said image display apparatus according to the respective pieces of display area information, said method comprising:

a step of determining the presence or absence of an overlapping area on the display section on the basis of said pieces of display area information transmitted from said image signal sources; and a step of processing either of the pieces of display area information of the images to be overlapping so as to eliminate the overlapping area as determined to exist by said determining section and display the images without overlapping.

In still another aspect of the invention, there is provided a recording medium storing a program including instructions for causing a computer to execute either of the above image display methods.

In a further aspect of the invention, there is provided an image display apparatus adapted to display a plurality of images on a display screen thereof in an overlapping manner, said apparatus comprising:

an input section for linking the image display apparatus and a plurality of external image signal sources by way of a communication network;

a determining section for determining the presence or absence of an overlapping area of the images from any two of said plurality of external image signal sources before displaying the images on said display screen; and an erasing section for erasing the image signal of the image to be displayed behind the other image for the overlapping area as determined to exist by said determining section.

In still another aspect of the invention, there is provided an image display apparatus adapted to display a plurality of images on a display screen thereof in an overlapping manner, said apparatus comprising:

an input section for linking the image display apparatus and a plurality of external image signal sources by way of a communication network;

a determining section for determining the presence or absence of an overlapping area of the images from any two of said plurality of external image signal sources before display the images on said display screen; and a processing section for processing either of the pieces of image information of the images to be overlapping so as to eliminate the overlapping area as determined to exist by said determining section and display the images without overlapping.

BRIEF DESCRIPTION OF THE DRAWINGS

FIGS. 1A, 1B, 1C, 1D and 1E are schematic illustrations of the principle underlying the operation of the first embodiment of image display system according to the invention.

DESCRIPTION OF THE PREFERRED EMBODIMENTS

Figure 2B:
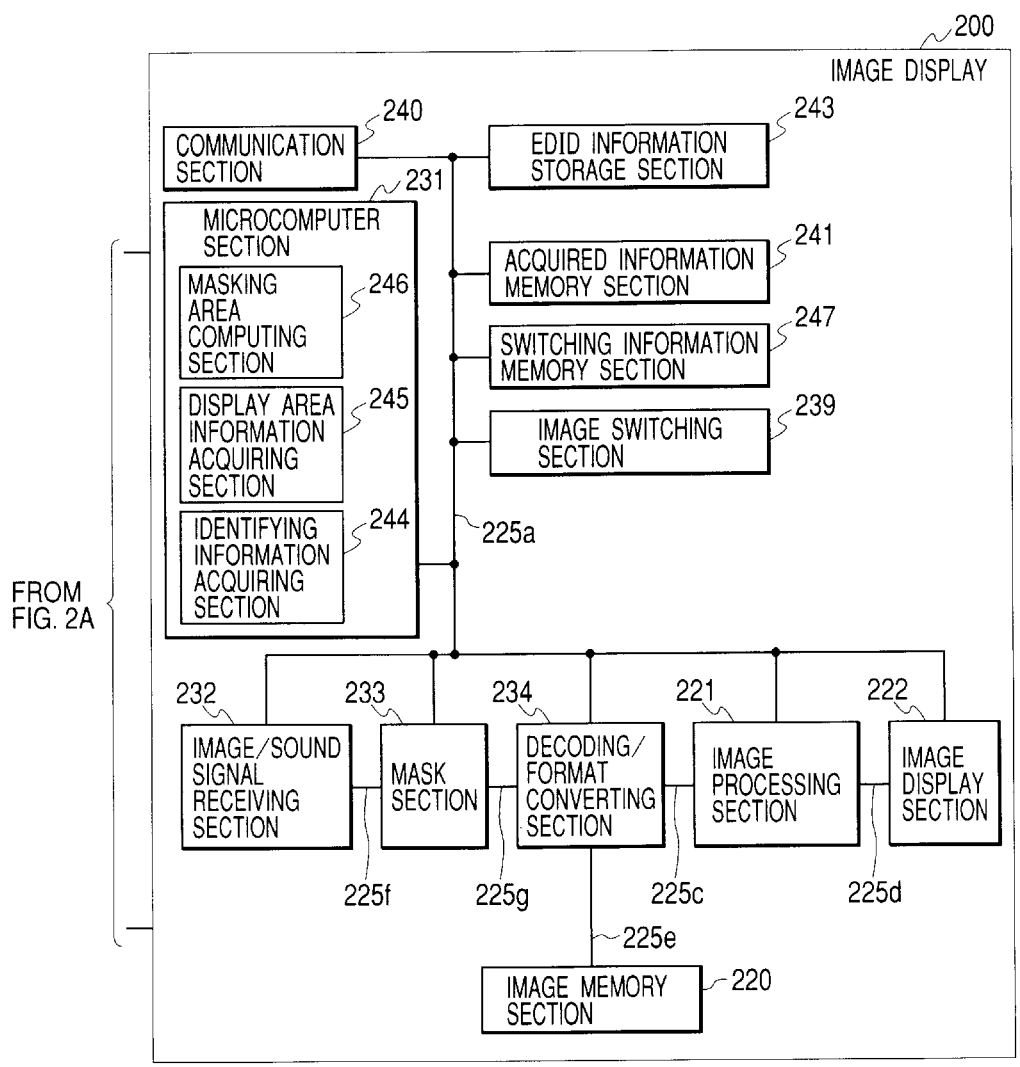
FIG. 2 is comprised of FIGS. 2A and 2B showing schematic block diagrams of the first embodiment of image display system according to the invention.

While the present invention relates to an image display system, an image display method and an image display apparatus, an image display apparatus according to the invention will be described below firstly.

An image display apparatus according to the invention is adapted to receive external image information and display one or more than one images on the display area of the display section (e. g., the display screen) of the apparatus according to the image information. The image display apparatus can be linked to a plurality of image information sources by way of a communication network. Then, if necessary, the image display apparatus appropriately edits the pieces of image information transmitted from the image information sources before displaying the images on the display screen. The image display apparatus and the image information sources can be linked by way of wires or by way of radio channels such as BlueTooth.

When some or all of the image information sources transmit instructions for displaying the images in respective specific areas of the display screen of the display section of the image display apparatus, they may be transmitted in the form of packets (a mode of data transmission with which data to be transmitted between a plurality of stations in the from of digital signals are divided into individual groups, which are then completely packetized, including so-called ATM transmission and any other types of connectionless communication such as frame relay communication).

As pointed out above, when some or all of the image information sources transmit instructions for displaying images in respective specific areas of the display screen of the display section of the image display apparatus, the image display apparatus appropriately edits the pieces of image information transmitted from the image information sources before displaying the images on the display screen. Additionally, the image display apparatus may be so adapted to cope with a situation where an image information source transmits an instruction for displaying an image in a specific area of the display screen of the image display apparatus and another image information source simply transmits a piece of image information without transmitting an instruction for displaying an image in a specific area of the image display apparatus (probably because it is not adapted to transmit such an instruction), by way of a communication network. For example, the image represented by the image signal from the latter image information source may be displayed on the entire display screen of the image display apparatus (or the area specified by the image display apparatus for image information for which no specific display area is specified) except the area specified by the instruction from the former image information source while the image represented by the image signal from the former image information source may be displayed in the specified area as the image display apparatus appropriately edits the images. Otherwise, the two images may be displayed in an overlapping manner.

The inventor of the present invention provides a system with which a plurality of information signal sources can specify display attributes typically by means of packet transmission and an image display apparatus can be linked to the information signal sources by way of a communication network and appropriately edit the pieces of information transmitted from the information signal sources.

Now, the present invention will be described by referring to the accompanying drawings that illustrate preferred embodiments of the invention.

Embodiment 1

(Underlying Principle)

Firstly, the principle underlying the operation of the first embodiment of image display system according to the invention will be described below. FIGS. 1A through 1E are schematic illustrations of the principle underlying the operation of the first embodiment of image display system according to the invention. In FIG. 1A, two images f6 and f7 are displayed on the display screen of the image display apparatus of this embodiment of image display system. FIGS. 1B and 1C respectively show the two images f6 and f7 that may be displayed according to the respective image signals transmitted typically from respective PCs. The image f6 is a website image transmitted by way of Internet and illustrating certain pieces of information including some results of baseball games, whereas the image f7 is a movie image reproduced from data stored in a DVD in the recording medium section of the corresponding PC.

FIG. 1D is an illustration showing the overlapping area f13 of the images f6 and f7 of FIG. 1A. FIG. 1E shows the two images f6 and f7 obtained by moving vertically and horizontally the image f7 by means of coordinate transformation to eliminate the overlapping area f13.

As the image signals representing the respective images f6, f7 are transmitted to the single image display apparatus from the respective PCs by way of a communication network to which the image display apparatus and the PCs are connected, the two displayed images may more often than not overlap each other in a manner as shown in FIG. 1A.

Assume here that the resolutions of the images f6, f7 are respectively 1,024×768 (XGA) and 1,280×720 (720P format) and the images f6, f7 are magnified respectively to 1.0 and 0.8 dimensions and displayed in such a way that the points f8 and, f12 of the image f6 and the points f11 and f9 of the image f7 are located diagonally. Then, an overlapping area f13 is produced with the points f12 and f13 located diagonally.

Also assume that the points f8, f12 and points f11, f9 have respective coordinate values of (0, 0), (1023, 767) and (800, 500), (1823, 1075) and the display screen of the image display apparatus has a resolution of QXGA (2048×1536).

Then, as will be described below, the data stored in the image memory of the image display apparatus for the two images will not show any mixed state when the data for the overlapping area f13 of the image f7 is erased. Conceptually, the data stored in the image memory of the image display apparatus for the two images are processed so as not to show any mixed state typically by masking the overlapping area f13 of the image f7 as shown in FIG. 1D in order to eliminate any overlap.

(System Configuration)

FIG. 2 is a schematic block diagram of the first embodiment of image display system according to the invention. As shown in FIG. 2, two PCs including PC 100 and PC 100' operating as image signal sources and adapted to transmit image signals and a PC display operating as image display apparatus 200 are connected to one another by way of transmission lines 114b, 114a. Assume that the image display system is adapted to packetize image signals and sound signals and transmit packets.

Also assume that the transmission lines 114a, 114b are bundled together into a single dedicated cable that operates as signal line adapted for cascade connection and tree connection conforming to a known standard such as TMDS or IEEE 1394.

The PCs 100, 100' respectively comprise communication sections 110, 110' for receiving EDID information that is attribute information of the image display apparatus 200, EDID information memory sections 111, 111' for storing the received EDID information, main memory sections 104, 104' of the main bodies of the PCs 100, 100' and recording medium sections 105, 105' adapted to store information in and reproduce information from a recording medium such as a hard disk, a flash memory or a CD (compact disk).

The attribute information of the image display apparatus 200 includes the resolution, the pixel frequency, the frame frequency, the gamma characteristics, the number of tones and the color characteristics of the apparatus.

The PCs 100, 100' further respectively comprise graphics drawing sections 106, 106' adapted to generate image signals and compress them into a format typically conforming to the MPEG (Moving Picture Experts Group) Standards, image memories 107, 107' to be used by the graphics drawing sections 106, 106' for generating image signals, identifying information multiplexing sections 116, 116' adapted to multiplex the generated image signals and the respective pieces of identifying information including the communication addresses and the ID numbers assigned to the main bodies of the PCs 100, 100' and also to the signals and image/sound signal transmitting sections 115, 115' for packetizing the image signals and other pieces of information and transmitting them to the image display apparatus 200.

Note that sound signals are generated by respective sound signal generating sections (not shown) and may or may not be mixed with respective image signals before being transmitted to the image display apparatus 200. It is so arranged between the PCs 100, 100' and the image display apparatus 200 that, when part of the image sent from either the PC 100 or the PC 100' to the image display apparatus 200 is rewritten, only the signal for that part of the image is transmitted from the PC 100 or the PC 100', whichever appropriate, to the image display apparatus 200 in order to avoid duplication. The signal for the part of the image to be rewritten is extracted by the graphics drawing section 106 or 106', whichever appropriate.

Furthermore, the PCs 100, 100' respectively comprise central processing units (CPUs) 102, 102' for controlling the components of the respective PCs and bus control sections 103, 103' for controlling the respective buses connecting the corresponding components.

The CPUs 102, 102' by turn respectively comprise image control sections 112, 112' for controlling the graphics drawing sections 106, 106' so as to form images according to the EDID information of the image display apparatus 200, the parameter values specified by the PCs 100, 100' for image display, the attributes that are defined according to the application program and so on and display area information generating sections 113, 113' for generating display area information specifying the display areas of the images to be displayed according to the image signals generated by the graphics drawing sections 106, 106'.

The attributes that are typically defined by the application program include the resolution, the pixel frequency, the frame frequency, the gamma characteristics, the number of tones, the color characteristics, the display area, the magnification and so on. The information on the display areas of the display screen include the position of the display area, the magnification and the resolution of each image to be displayed on the display screen of the image display apparatus 200.

The PCs 100, 100' further respectively comprises data buses 111a, 111a' for connecting the related components thereof, connection lines 111b, 111b' for connecting the CPUs 102, 102' and the bus control sections 103, 103' and connection lines 111e, 111e' for connecting the graphics drawing sections 106, 106' and the image memories 107, 107'.

The image/sound signal transmitting sections 115, 115' are adapted to use a transmission method such as TMSD that conforms to the DVI (Digital Visual Interface) Standards defined by the DDWG (Digital Display Working Group) or the one defined in the IEEE 1394 Standards.

The DDC refers to a communication protocol for a computer to observe in order to recognize and control a display apparatus as recommended by the VESA (Video Electronic Standards Association), which is a society for standardizing displays and related devices. The information on the attributes of the image display apparatus 200 described in the EDID (Extended Display Identification Data) format is transmitted to the PCs 100, 100' by means of this communication method. This is described in the EDID Standard, Version 3 (revised on Nov. 13, 1997).

The above described DVI Standards define the function of communication between an image display apparatus 200 and PCs 100, 100' according to the DDC communication protocol and also the hot plug function (for DDC communication between an image display apparatus 200 and PCs 100, 100' that are mutually connected to one another). The hot plug function is used to detect if a PC that has not been connected to an image display apparatus becomes connected to the latter by observing a change of the electric potential of the PC from a potential pulled up or down by means of a resistor to a ground or power source potential.

On the other hand, the image display apparatus 200 comprises an image/sound receiving section 232 for receiving the packetized image signals transmitted from the image/sound transmitting sections 115, 115', an acquired information memory section 241 for storing various pieces of information multiplexed with the image signals received by the image/sound receiving section 232, a switch information memory section 247 for storing information on which of the images transmitted from the PCs 100, 100' is displayed in front of the other and an image switching section 239 typically comprising a mouse, an operation key and/or a remote control interface for switching from a piece of information to another stored in the switch information memory section 247.

The image display apparatus 200 additionally comprises a mask section 233 for erasing one of the received image signals for the overlapping area f13 shown in FIG. 1D according to various pieces of information stored at least in the acquired information memory section 241 and the switch information memory section 247, a decoding/format converting section 234 for decoding the received image signal and converting the format thereof in terms of resolution, frame rate (frame frequency) and so on and an image memory section 220 for temporarily storing the received image signals for the purpose of format conversion.

The image display apparatus 200 further comprises an image processing section 221 for performing converting operations on the gamma characters and the color characters of the image signals obtained as a result of format conversion and operations of displaying characters on an on-screen display basis, an image display section 222 typically comprising a liquid crystal display, a CRT, a PDP, an EL display or an LED display for displaying the processed image, an EDID information memory section 243 for storing the EDID information of the main body of the image display apparatus 200, a communication section 240 for transmitting the EDID information stored in the EDID information memory section 243 to the PCs 100, 100' and a microcomputer section 231 for controlling the above sections.

The sounds of the sound signals transmitted from the PCs 100, 100' are output from loudspeakers (not shown) as they are synchronized typically by means of a buffer with the corresponding image signals that are output to the image display section 222.

The microcomputer section 231 by turn comprises an identifying information acquiring section 244 for extracting the identifying information multiplexed with the image signals received by the image/sound receiving section 232, a display area information acquiring section 245 for acquiring display area information multiplexed with the image signals received by the image/sound receiving section 232 and a masking area computing section 246 for computationally determining the area to be masked by the mask section 233.

Furthermore, the image display section 200 comprises a connection line 225f connecting the image/sound receiving section 232 and the mask section 233, a connection line 225g connecting the mask section 233 and the decoding/format converting section 234, a connection line 225e connecting the decoding/format converting section 234 and the image memory 220, a connection line 225c connecting the decoding/format converting section 234 and the image processing section 221, a connection line 225d connecting the image processing section 221 and the image display section 222 and a control bus/data bus 225a connecting the microcomputer section 231 and the other sections.

Figure 3:
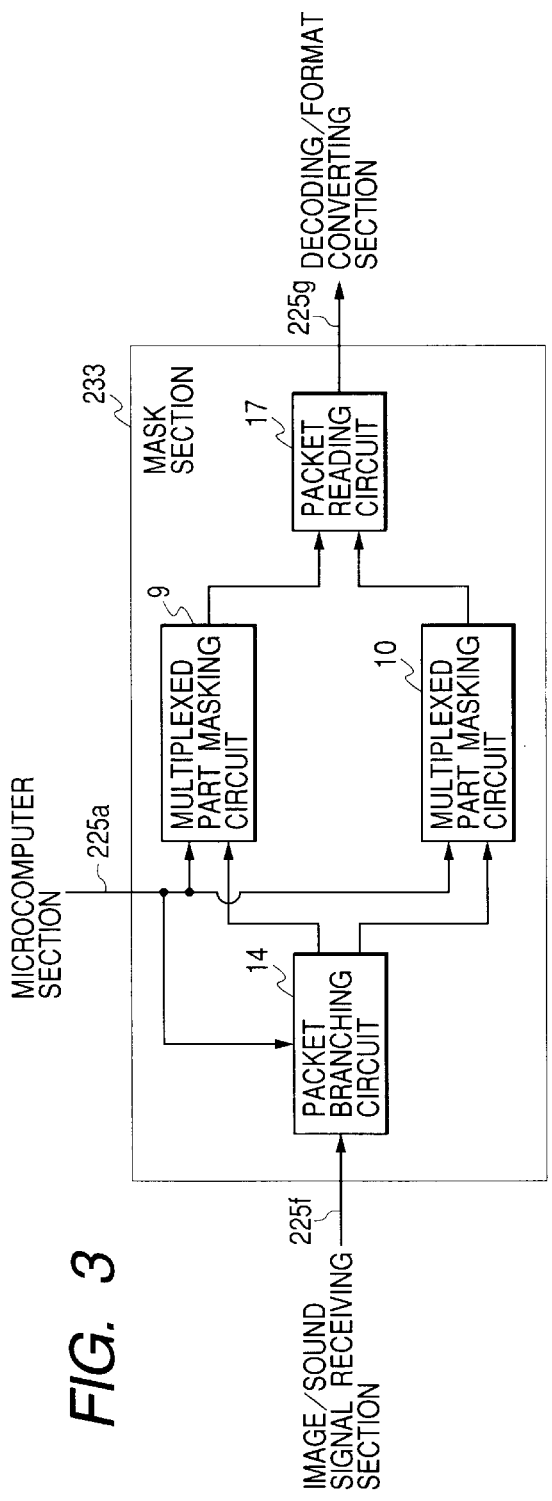
FIG. 3 is a schematic block diagram of the mask section of FIGS. 2A and 2B, illustrating its internal configuration.

FIG. 3 is a schematic block diagram of the mask section 233 of FIGS. 2A and 2B, illustrating its internal configuration. More specifically, FIG. 3 shows a packet branching circuit 14 for branching the packets input to the mask section 233 by way of the data bus 225a for sorting and leading the packets input to it according to the branching instruction contained in the identifying information input to it by way of the data bus 225a, overlapping part masking circuits 9, 10 for masking the overlapping part of the images of the sorted packets according to the instruction input to it by way of the data bus 225a and a packet reading circuit 17 for sequentially reading the packets output from the overlapping part masking circuits 9, 10 to the connection line 225g.

More specifically, the packet branching circuit 14 outputs the packet containing the image signal of the image as shown in FIG. 1B to the overlapping part masking circuit 9 and the packet containing the image signal of the image as shown in FIG. 1C to the overlapping part masking circuit 10. Then, the overlapping part masking circuit 10 masks the part of the image signal contained in the input packet and corresponding to the overlapping part f13 so that an image as shown in FIG. 1D may be obtained.

While only two overlapping part masking circuits 9, 10 are shown in FIG. 3, the mask section 233 may in reality comprise much more overlapping part masking circuits, the number of which corresponds to that of the image signal sources connected to the image display apparatus 200.

Figure 4:
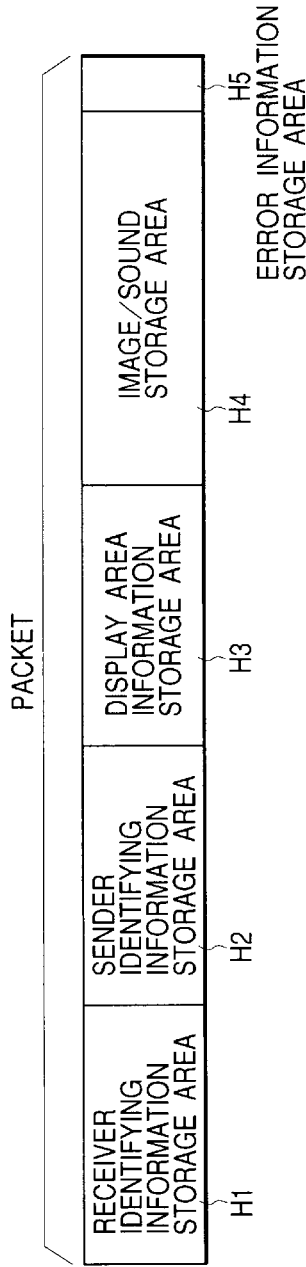
FIG. 4 is a schematic illustration of the configuration of a packet storing image signal and other signals transmitted from the image/sound transmitting section shown in FIG. 3.

FIG. 4 is a schematic illustration of the configuration of a packet containing an image signal and other signals transmitted from the image/sound transmitting section 115 or 115' shown in FIG. 3. Referring to FIG. 4, H1 denotes the receiver identifying information storage area of about 4 bytes containing information for identifying the image display apparatus 200 that receives the packet and HZ denotes a sender identifying information storage area of about 4 bytes containing information for identifying the identifying information assigned to each of the PCs 100, 100' either of which transmits the packet, whereas H3 denotes a display area information storage area of about 4 bytes containing information on the display area of the image of the image signal contained in the packet, H4 denotes an image/sound signal storage area of about 40 bytes containing the image signal and the sound signal of the packet and H5 denotes an error information storage area containing information on checksum and parity features.

Operation

Figure 5:
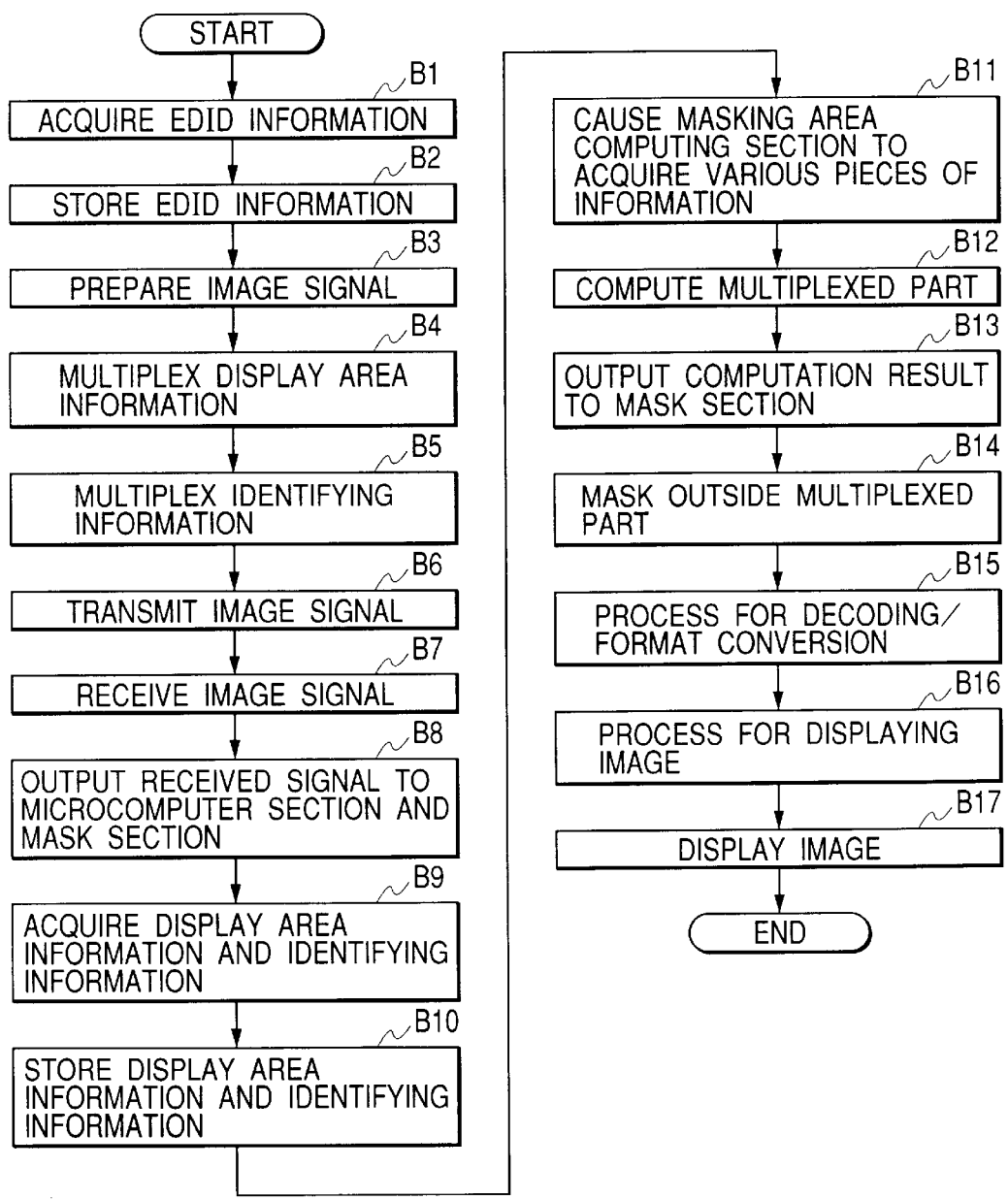
FIG. 5 is a flow chart of the operation of the image display system shown in FIGS. 2A and 2B.

Table 1 shown below illustrates the various conditions specified in the image display system and some of the results obtained as a result of the computation operation of the masking area computing section 246. FIG. 5 is a flow chart of the operation of the image display system shown in FIGS. 2A and 2B.

Table 1 shows display area information including the resolution, the display magnification and the display position, the EDID information of the image display apparatus 200, the switching information input from the image switching section 239, the display resolution obtained by multiplying the resolution by the display magnification and the coordinates of the overlapping area f13.

More specifically, the image information for the image f6 sent from the PC 100 includes the resolution of XGA (1024×768), the display magnification of 1, the display area of a rectangular parallelepiped with a diagonal defined by the coordinates of (0, 0) and (1023, 767). On the other hand, the image information for the image f7 sent from the PC 100' includes the resolution of HD720P (1280×720), the display magnification of 0.8, the display area of a rectangular parallelepiped with a diagonal defined by the coordinates of (800, 500) and (1823, 1075). The EDID information of the image display apparatus 200 includes the resolution of QXGA (2048, 1536). Switching information for displaying the image f6 in front of the image f7 is also provided.

TABLE 1

| | Conditions and resuts of computation | |
|---|---|---|
| | PC 100 | PC 100' |
| Display area | | |
| Resolution | XGA (1024 × 768) | HD720P (1280 × 720) |
| Display magnification | 1.0 | 0.8 |
| Display position | box with a diagonal defined by (0, 0), (1023, 767) | box with a diagonal defined by (800, 500), (1823, 1075) |
| EDID information | resolusion QXCA (2048 × 1536) | |
| Switching Information | front side | rear side |
| Display resolution | 1024 × 768 | 1024 × 576 |
| Overlapping area | box with a diagonal defined by (800, 500), (1023, 767) | |

Now, the operation of the image display system of FIGS. 2A and 2B will be described in terms of the conditions listed in Table 1 above by referring to the flow chart of FIG. 5.

Firstly, before transmitting the image signals representing respectively the images f6, f7 to the image display apparatus 200, the PCs 100, 100' acquire the EDID information that is the attribute information of the image display apparatus 200 by way of the communication sections 110, 110' and the transmission line 114b (Step B1). Then, they store the EDID information in the EDID information memory sections 111, 111' by way of the data buses 111a, 111a' respectively (Step B2).

Thereafter, the graphics drawing sections 106, 106' of the PCs 100, 100' respectively generates image signals for the images f6, f7 according to the instructions output from the image control sections 112, 112' (Step B3). Subsequently, the image signals are output to the data buses 111a, 111a' respectively.

Then, the display area information generating sections 113, 113' generate respective pieces of display area information on the basis of the user instructions, the EDID information stored in the EDID information memory sections 111, 111' and including the display coordinates and the display magnifications and multiplex the pieces of information and the image signals (Step B4). Furthermore, the identifying information multiplexing sections 116, 116' multiplex the respective pieces of identifying information assigned to the PCs 100, 100' and the signals themselves with the respective pieces of image information (Step B5).

Then, the image/sound transmitting sections 115, 115' packetize the respective image signals and other pieces of information in a manner as illustrated in FIG. 4. More specifically, in each prepared packet, the display area information and the identifying information multiplexed with the image signal are contained respectively in the display area information storage area H3 and the sender identifying information storage area H2 and the receiver identifying information for identifying the image display apparatus 200 that is the receiver of the packet as generated on the basis of the EDID information stored in the EDID information memory section 111 or 111' is contained in the receiver identifying information storage area H1.

The checksum and parity features of each packet are generated on the basis of the image signal and other pieces of information and contained in the error information storage area H5. The packet containing the image signal and other pieces of information is then output to the transmission line 114a so that it may be transmitted to the image display apparatus 200 by way of the transmission line 114a (Step B6).

Upon receiving the packet, the image display apparatus 200 confirms that the packet is addressed to it by referring to the receiver identifying information storage area H1 of the packet output to the transmission line 114a and receives the packet by way of the image/sound receiving section 232 (Step B7). The received packet is then copied by the image/sound receiving section and output to the display area information acquiring section 245, the identifying information acquiring section 244 and the mask section 233 by way of the data bus 225a and the connection line 225f (Step B8).

The display area information acquiring section 245 and the identifying information acquiring section 244 respectively acquire the display area information and the identifying information contained respectively in the display area information storage area H3 and the sender identifying information storage area H2 (Step B9) and stores them in the acquired information memory section 241 by way of the data bus 225a (Step B10).

Subsequently, the acquired information memory section 241 is triggered to operate as it receives these pieces of information and outputs the pieces of information it stores to the masking area computing section 246 by way of the data bus 225a.

Upon receiving the pieces of information from the acquired information memory section 241, the masking area computing section 246 acquires the EDID information from the EDID information memory section 243 and also the switch information from the switch information memory section 247 by way of the data bus 225a (Step B11) and computationally determines which of the images f6 and f7 is to be masked for the overlapping area f13 on the basis of all the pieces of information it acquired (Step B12).

The EDID information is used to find out if the display coordinates obtained from the display area information storage areas H3 of the packets transmitted from the PCs 100, 100' satisfy the requirements of the EDID information of the image display apparatus 200 or not. For example, it is checked if the display coordinates are not beyond the area defined by the coordinates (2049, 1536) provided by the image display section 222 of the image display apparatus 200 for the display screen. Then, it is used to modify either or both of the display positions of the images f6, f7 on the basis of the result of the check.

Figure 7A:
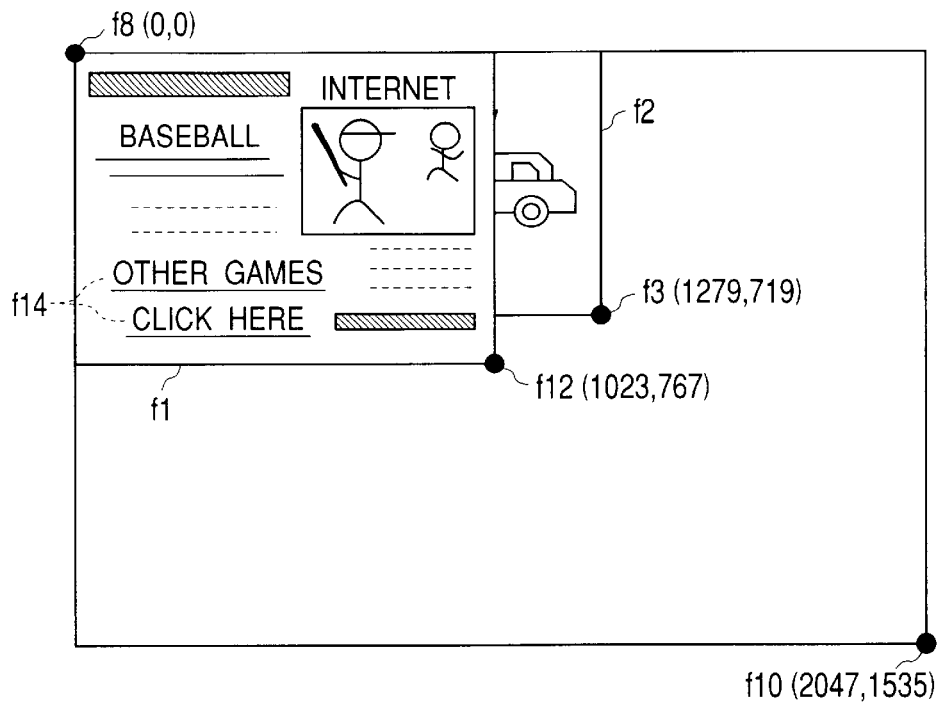
FIGS. 7A and 7B are schematic illustrations of the principle underlying the operation of the second embodiment of image display system according to the invention.

The masking area computing section 246 specifies the coordinates of the points f8, f12, f11 and f9 shown in FIG. 1A from the display area information stored in the acquired information memory section 241. Additionally, it specifies that the image f2 shown in FIG. 7A is to be moved from the switching information stored in the switching information memory section 247.

Then, it is concluded from the points f12 and f11 that there exists an overlapping area for the images f6, f7 and the image f7 is to be masked for the overlapping area f13. Then, arithmetic operations are performed to converts the coordinates of each of the spots of the overlapping area f13 of the image f7 to those of the coordinate system originating from f8 (0, 0).

The masking area computing section 246 outputs the results of the arithmetic operations to the mask section 233 by way of the data bus 225a (Step B13). Then, the mask section 233 masks the overlapping area f13 of the image f7 represented by the image signal contained in the packet sent from the image/sound receiving section 232 on the basis of the results of the arithmetic operations (Step B14).

Now, the operation of the mask section 233 will be discussed. The results of the arithmetic operations sent from the masking area computing section 246 by way of the data bus 225a and the packet transmitted through the connection line 225f are received by the packet branching circuit 14 of the mask section 233 as shown in FIG. 3.

The results of the arithmetic operations sent out from the masking area computing section 246 contains the information commanding that the packet sent from either of the PCs 100, 100' is to be led to either of the overlapping part masking circuits 9, 10. Therefore, the packets input to the packet branching circuit 14 of the mask section 233 are sequentially sorted and led to either of the overlapping part masking circuits 9, 10.

Assume that the results of arithmetic operations output from the masking area computing section 246 include the information commanding that the packet from the PC 100 is to be output to the overlapping part masking circuit 9, whereas the packet from the PC 100' is to be output to the overlapping part masking circuit 10.

The overlapping part masking circuits 9, 10 receive the information indicating the part of either of the image signals to be erased from the masking area computing section 246 by way of the data bus 225a. For instance, the overlapping part masking circuit 9 may receive the information indicating that the image signal it receives will not be erased at all, whereas the overlapping part masking circuit 10 may receive the information indicating that the image signal it receives will be partly erased for the overlapping area F13 as shown in FIG. 1D.

Then, the overlapping part masking circuit 9 allows the input packet to go through, whereas the overlapping part masking circuit 10 masks part of the image of the image signal contained in the input packet according to the information commanding that the overlapping part f13 as shown in FIG. 1D is to be erased before outputting it to the packet reading circuit 17.

The packet reading circuit 17 sequentially reads the packets it receives and outputs them to the decoding/format converting section 234 by way of the connection line 225g.

The decoding/format converting section 234 decodes the image signals contained in the packets sent from the mask section 233, using the image memory section 220, and converts the format of each of the image signals in terms of resolution and frame frequency so that the image signal may be adapted to the number of display pixels of the image display section 222 (Step B15).

The image signals subjected to the format converting operation are then output to the image processing section 221 by way of the connection line 225c. Then, the image processing section 221 performs processing operations on the image signals for converting the gamma characteristics and the color characteristics (Step B16). The processed image signals are then output to the image display section 222 by way of the connection line 225d to display an image as shown in FIG. 1A (Step B17).

Since the overlapping part f13 of the image f7 in FIG. 1A is erased by the mask section 233, no problem arises to the image in terms of degradation of image quality and missing parts of images.

In this embodiment, the mask section 233 is arranged between the image/sound receiving section 232 and the decoding/format converting section 234 so that the signals are processed by the mask section 233 for the overlapping area f13 before they are processed further by the decoding/format converting section 234 and the downstream sections.

As the mask section 233 is arranged between the image/sound receiving section 232 and the decoding/format converting section 234 as described above, it is not necessary to arrange as many decoding/format converting sections 234, image processing sections 221 and image display sections 222 as the number of image signal sources connected to the image display apparatus 200 and hence the cumbersome problem of increasing the memory capacity of the image memory section 220 and the processing capacity of the decoding/format converting section 234 can be successfully avoided.

Differently stated, if the mask section 233 is not arranged between the image/sound receiving section 232 and the decoding/format converting section 234 and if it is assumed that two QXGA (2048×1536 pixels) images are input simultaneously and that the volume of the input image information is not compressed and equal to 8 bits for each pixel of the three primary colors of R, G and B, the decoding/format converting section 234 requires a memory capacity of 2048×1536×2×3×8=151 Mbits.

Then, if the frame rate is equal to 60 Hz, the amount of data to be handled per second is 151×60=9.1 Gbits/second.

The amount of data increases proportionally as the number of images input thereto increases.

On the other hand, when the mask section 233 is arranged between the image/sound receiving section 232 and the decoding/format converting section 234 as in the case of this embodiment, the memory capacity required for the decoding/format converting section 234 is 2048×1536×1×3×8=75.5 M bits.

Then, if the frame rate is equal to 60 Hz, the amount of data to be handled per second is 75.5×60=4.5 Gbits/second.

Since this value is invariable regardless of the number of image signal sources connected to the image display apparatus 200, this embodiment can avoid any possible increase in the memory capacity of the image memory section 220 and the volume of arithmetic operations of the decoding/format converting section 234.

While the operation of this embodiment of image display system is described above on the assumption that the images f6 and f7 show an overlapping area, packets are input not to the mask section 233 but directly to the decoding/format converting section 234 by way of the data bus 225a when the images f6 and f7 do not show any overlapping area.

If the user wants to see the entire image f7 while both the images f6 and f7 are displayed as shown in FIG. 1A, he or she can input a command for causing the image switching section 239 to display the image f7 in front of the image f6 or drag the image f7 to a position where it does not overlap the image f6.

As the user operates in such a way, the image display apparatus 200 may request the PC 100' to retransmit the image signal of the image from which the overlapping area f13 has been erased so that the image may be displayed without being masked, if partly, or hold the part of the image signal for the erased overlapping area f13 and display the masked area according to the command input from the image switching section 239.

When dragging the image f7 to a position where it does not overlap the image f6 and hence there is no overlapping area f13, the size of either the image f6 or the image f7 may have to be reduced depending on the resolution of the image f6 and that of the image f7 and the coordinate values provided by the image display section 222.

In FIG. 1A, the size of the image f6 and that of the image f7 are defined respectively by 800×500 and 800×768. Therefore, the sum of the width of the image f6 and that of the image f7 in the x-direction and the sum of the height of the image f6 and that of the image f7 in the y-direction will be respectively 1600 and 1268. On the other hand, the display screen of the image display section 222 is 2047× 1535. Therefore, neither the size of the image f6 nor that of the image f7 do not need to be reduced for displaying the images f6 and f7 on the display screen of the image display section 222 when the image f7 is dragged in such a way that the point f9 (1823, 1075) is moved to the point f10 (2047, 1535) while the image f6 is held to the original position.

In short, neither the size of the image f6 nor that of the image f7 do not need to be reduced for displaying the images f6 and f7 on the display screen of the image display section 222 when the sum of the widths of the images f6 and f7 is not greater than 2047 or the sum of the heights of the images f6 and f7 is not greater than 1535.

Generally, when moving the image f7 and the coordinates of a point in the image f7 before and after moving the image f7 are respectively $(X_0, Y_0)$ and $(X_1, Y_1)$, while the image is moved by $(\alpha, \beta)$, $(X_1, Y_1)$ is expressed by $$X_1 = X_0 + \alpha \text{ and}$$

$$Y_1 = Y_0 + \beta.$$

On the other hand, if the sum of the X components and that of the Y components of the images f6 and f7 exceed respectively the width and the height of the display screen of the image display section 222, either the image f6 or the image f7 has to be reduced so that the sum of the X components or that of the Y components of the images f6 and f7 may not exceed respectively the width or the height of the display screen of the image display section 222 when both of the image f6 and image f7 are to be displayed without any overlapping area.

For reducing the size of either of the images, the following arithmetic operations will be performed. When reducing the size of the image f7 by referring to the point f11, assume that a point in the image f7 that is arbitrarily selected is expressed by coordinates $(X_0, Y_0)$ and $(X_1, Y_1)$ before and after the size reduction respectively and the image f7 is moved by $(\alpha, \beta)$, while the coordinates of the point f11 after the modification and the move is $(\alpha_1, \beta_1)$ and the image f7 is magnified a and b times respectively in the X- and Y-directions. Then, $(X_1, Y_1)$ are expressed by the formulas below.

$$X_1 = a(X_0 - 800) + \alpha_1 \text{ and}$$

$$Y_1 = a(X_0 - 500) + \beta_1.$$

Therefore, if the coordinates of the reference point corresponding to $(\alpha_1, \beta_1)$ before the modification and the move are $(\alpha_0, \beta_0)$, the following equations hold true.

$$X_1 = a(X_0 - \alpha_0) + \alpha_1 \text{ and}$$

$$Y_1 = a(X_0 - \beta_0) + \beta_1.$$

The microcomputer section 231 may typically performs these arithmetic operations so that the images f6 and f7 may be made free from any overlapping area when displayed on the display screen of the image display section 222.

Figure 6:
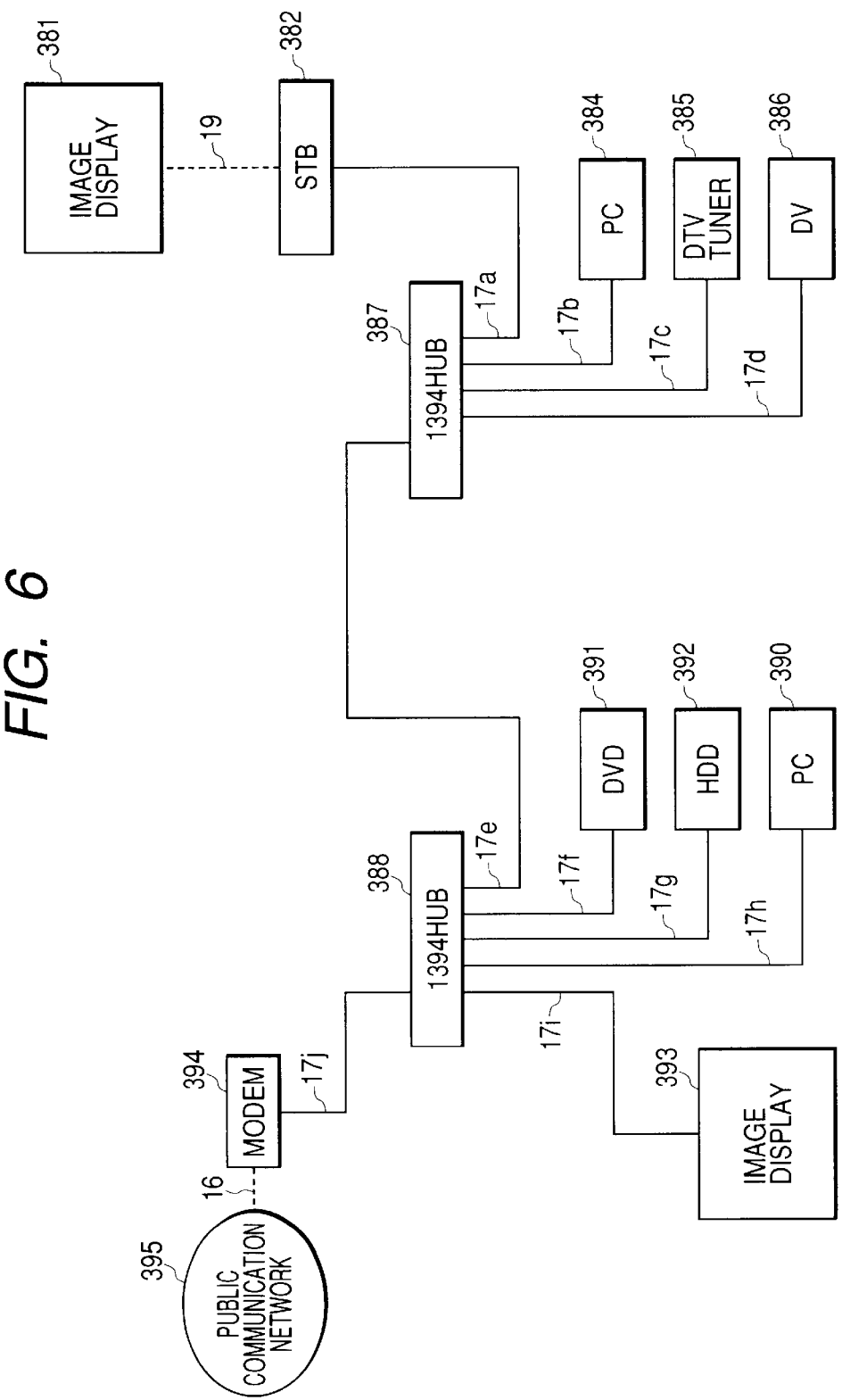
FIG. 6 is a schematic block diagram of a system including the image display system of FIGS. 2A and 2B and other electric devices.

FIG. 6 is a schematic block diagram of a system including the image display system of FIGS. 2A and 2B and other electric devices. In FIG. 6, there are shown image display apparatus 381 and 393 that correspond to the image display apparatus 200 of FIG. 2B and PCs 384 and 390 that correspond to the PCs 100, 100' in FIG. 2A. The electric devices are connected to one another in a manner typically conforming to the standards of HAVi or Jini.

FIG. 6 shows a public communication network 395 such as PSDN (Public Switched Data Network) or ISDN (Integrated Services Digital Network), a modem 394 for modulating the signals to be transmitted and demodulating the received signals, electric devices 384 through 386 and 390 through 392, IEEE 1394 hubs (HUBS) 387, 388 sorting and connecting IEEE 1394 signals and a set top box (STB) 382 connecting the image display apparatus 381 and the IEEE 1394 hub 387.

FIG. 6 further shows communication lines 17a through 17i connecting the electric devices 384 through 386 and 390 through 392 and also connecting the IEEE 1394 hubs 387, 388 to each other, said communication lines conforming to the IEEE 1394 Standard, a connection line 17j connecting the modem 394 and the IEEE 1394 hub 398, a connection line 16 connecting the modem 394 and the public communication network 395, said connection line may typically be a telephone line, and a cable 19 connecting the set top box 382 and the image display apparatus 381 and dedicated to images such as one with a D terminal.

The electric devices include a digital television tuner (DTV Tuner) 385, a digital video set (DV) 386, PCs 384, 390, a DVD disk player (DVD) 391 and a hard disk drive (HDD) 392 that is adapted to record television programs. As a network system as shown in FIG. 6 is established, the user can remotely control any of the electric devices to display images on the display screen of each of the image display apparatus 381, 393.

While the image signal sources of the above described embodiment are PCs 100, 100', one or more than one TV sets and one or more than one DV sets may be added to the embodiment as image signal sources. Additionally, the image display apparatus 200 of the embodiment comprises a mask section 233 and other related components for masking the overlapping area, if any, of either of the two images to be displayed on the display screen of the image display apparatus 200 in the above description, it may alternatively be so arranged that the STB is made to comprise a mask section 233 adapted to mask the overlapping area, if any, of either of the two images to be displayed on the display screen of the image display apparatus 381.

2nd Embodiment

Underlying Principle

Figure 7B:
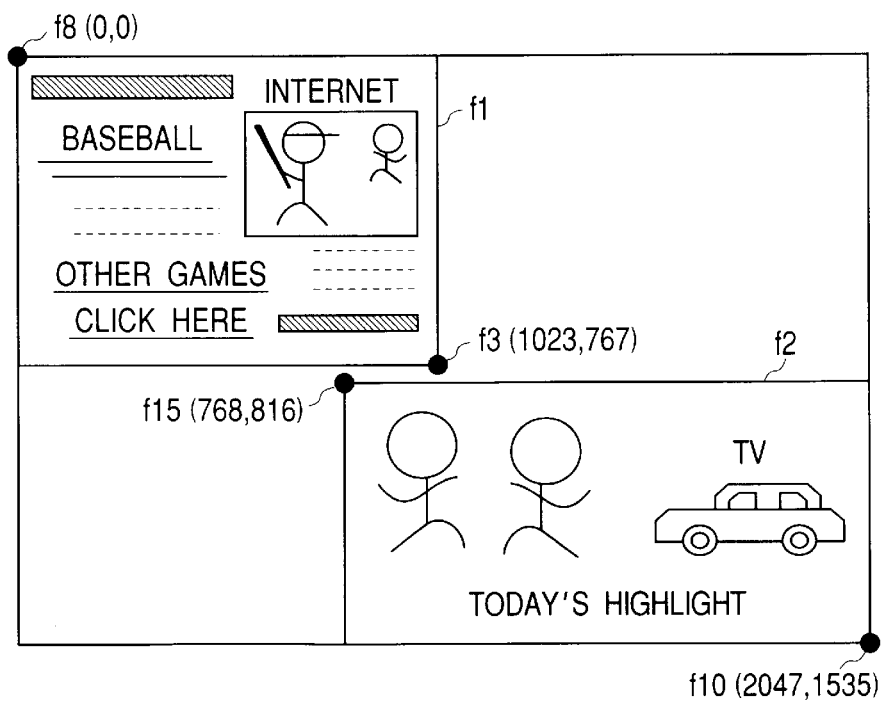

FIG. 7A shows two images f1, f2 that may be displayed on the display screen of an image display apparatus of the second embodiment of image display system according to the invention before processing the image signals of the images. FIG. 7B shows the two images f1, f2 displayed on the display screen after processing the image signals. It will be appreciated that the images f1, f2 shown in FIGS. 7A and 7B corresponds to the images f6, f7 shown in FIGS. 1B and 1C.

In this embodiment, the image signals of the two images that may produce an overlapping area f14 as shown in FIG. 7A unless the image signals are processed will be done so in order to prevent producing any overlapping area as shown in FIG. 7B. While a technique with which the user can drag the image f7 to a position where it does not overlap the image f6 is described for the first embodiment, the user can eliminate any such overlapping area of two images without any dragging operation with this embodiment of image display system does.

(System Configuration)

Figure 8B:
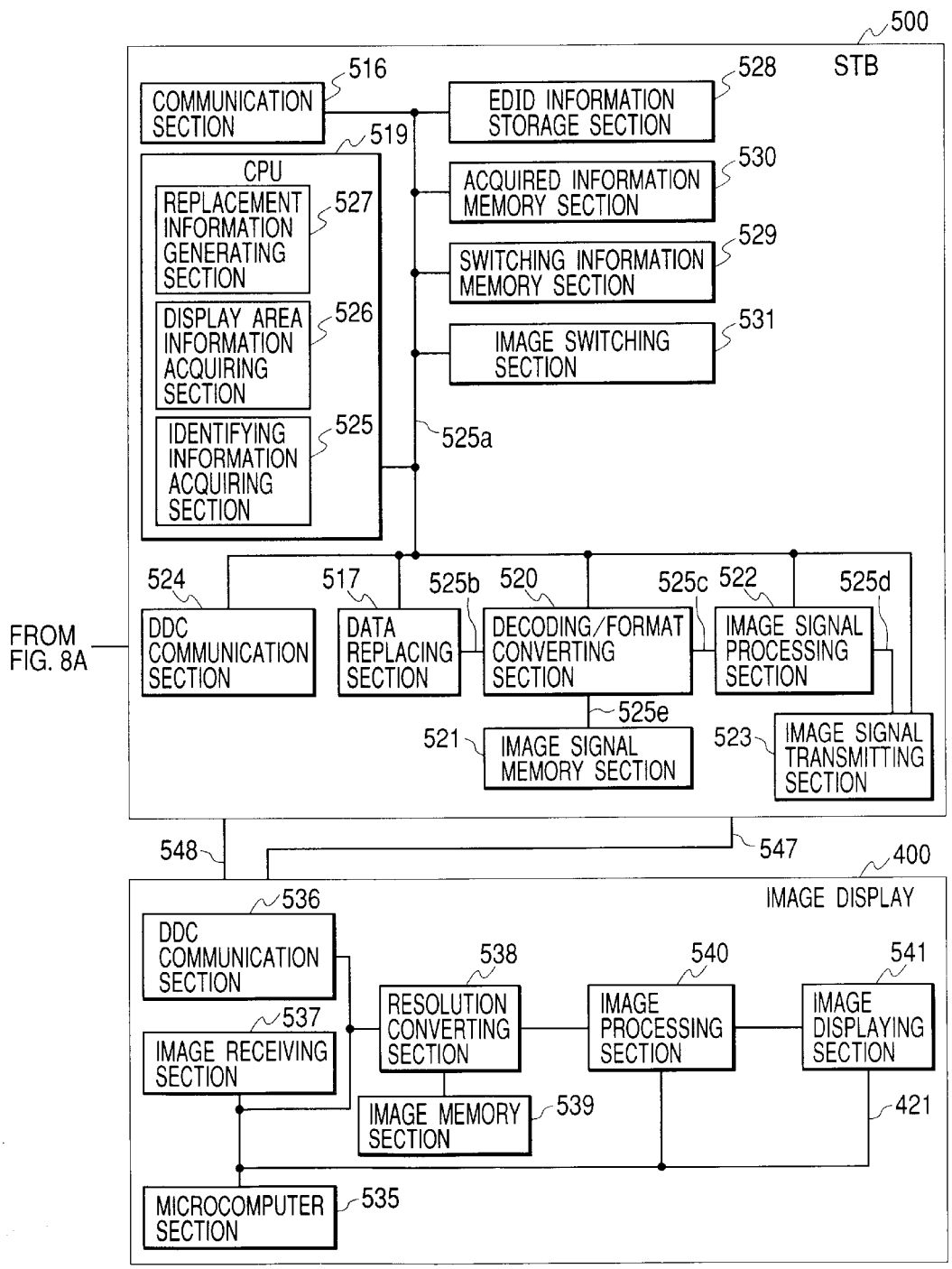
FIG. 8 is comprised of FIGS. 8A and 8B showing schematic block diagrams of the second embodiment of image display system according to the invention.

FIGS. 8A and 8B are schematic block diagrams of the second embodiment of image display system according to the invention. As shown in FIGS. 8A and 8B, two PCs including PC 300 and PC 300' operating as image signal sources and adapted to transmit image signals and a PC display operating as image display apparatus 400 are connected to one another by way of an STB 500.

In this embodiment, the PCs 300, 300' and STB 500 are connected to each other by a transmission line 545 conforming to the IEEE 1394 Standard so as to transmit and receive image signals and other signals such as those representing EDID information. Additionally, the image display apparatus 400 and the STB 500 are connected by a transmission line 545 for transmitting image signals conforming to the VGA Standard or the DVI Standard and also by a communication line 548 for DDC communication. In reality, the transmission line 547 and the communication line 548 are bundled together into a single dedicated cable.

The PCs 300, 300' respectively comprise communication sections 319, 319' for receiving EDID information that is attribute information of the image display apparatus 400, converting the generated image signals and other signals into signals conforming to the IEEE 1394 Standard and transmitting the converted signals to the image display apparatus 400, EDID information memory sections 310, 310' for storing the received EDID information, main memory sections 304, 304' of the main bodies of the PCs 300, 300' and recording medium sections 305, 305' adapted to store information in and reproduce information from a recording medium such as a hard disk, a flash memory or a CD (compact disk).

The attribute information of the image display apparatus 400 includes the resolution, the pixel frequency, the frame frequency, the gamma characteristics, the number of tones and the color characteristics of the apparatus.

The PCs 300, 300' further respectively comprise graphics drawing sections 306, 306' adapted to generate image signals and compress them into a format typically conforming to the MPEG (Moving Picture Experts Group) Standards, image memories 307, 307' to be used by the graphics drawing sections 306, 306' for generating image signals and identifying information multiplexing sections 314, 314' adapted to multiplex the generated image signals and the respective pieces of identification information including the communication addresses and the ID numbers assigned to the main bodies of the PCs 300, 300' and also to the signals.

It is so arranged between the PCs 300, 300' and the image display apparatus 400 that, when part of the image sent from either the PC 300 or the PC 300' to the image display apparatus 400 is rewritten, only the signal for that part of the image is transmitted from the PC 300 or the PC 300', whichever appropriate, to the image display apparatus 400 in order to avoid duplication. The signal for the part of the image to be rewritten is extracted by the graphics drawing section 306 or 306', whichever appropriate.

Furthermore, the PCs 300, 300' respectively comprise central processing units (CPUs) 302, 302' for controlling the components of the respective PCs and bus control sections 303, 303' for controlling the respective buses connecting the corresponding components.

The CPUs 302, 302' by turn respectively comprise image control sections 311, 311' for controlling the graphics drawing sections 306, 306' so as to form images according to the EDID information of the image display apparatus 400, the parameter values specified by the PCs 300, 300' for image display, the attributes that are defined according to the application program and so on and display area information generating sections 312, 312' for generating display area information specifying the mode of displaying images generated by the graphics drawing sections 306, 306' on the image display apparatus 400 according to the command given by the user.

The attributes that are typically defined by the application program include the resolution, the pixel frequency, the frame frequency, the gamma characteristics, the number of tones, the color characteristics, the display area, the magnification and so on. The information on the display areas of the display screen include the position of the display area, the magnification and the resolution of each image to be displayed on the display screen of the image display apparatus 400.

The PCs 300, 300' further respectively comprises data buses 311a, 311a' for connecting the related components thereof, connection lines 311b, 311b' for connecting the CPUs 302, 302' and the bus control sections 303, 303' and connection lines 311e, 311e' for connecting the graphics drawing sections 306, 306' and the image memories 307, 307'.

On the other hand, the image display apparatus 400 comprises an image receiving section 537 for receiving image signals transmitted from the STB 500 in a format typically conforming to TMDS or IEEE 1394 Standard, a resolution converting section 538 for converting the resolution and the frame frequency of the received image signals in order to make them adapted to the number of display pixels of the main body of the image display apparatus 400, an image memory section 539 for temporarily storing the received image signals for the purpose of converting the image resolution, an image processing section 540 for performing converting operations on the gamma characters and the color characters of the image signals obtained as a result of converting the resolution and operations of displaying characters on an on-screen display basis, an image display section 541 typically comprising a liquid crystal display, a CRT, a PDP, an EL display or an LED display for displaying the processed image, a DDC communication section 536 for transmitting the EDID information of the main body of the image display apparatus 400 to the PCs 300, 300 and a microcomputer section 535 for controlling the above sections and a data bus 421 for connecting the above sections.

The STB 500 comprises a communication section 516 for receiving the image signals from the PCs 300, 300' and transmitting the EDID information from the image display apparatus 400 to the PCs 300, 300', an acquired information memory section 530 for temporarily storing various pieces of information multiplexed with the image signals received by the communication section 516, a switch information memory section 529 for storing information on which of the images transmitted from the PCs 300, 300' is moved if they are overlapping, an image switching section 531 typically comprising a mouse, an operation key and/or a remote control interface for switching from a piece of information to another stored in the switch information memory section 529, a DDC communication section 524 for receiving the ED ID information transmitted from the image display apparatus 400 and an EDID information memory section 528 for storing the received EDID information.

The STB 500 further comprises a data replacing section 517 for replacing the display area information stored in the acquired information memory section 530 so as to shift the status of the images as shown in FIG. 7A to the status of the images as shown in FIG. 7B at least on the basis of information stored in the acquired information memory section 530 and the switch information memory section 529, a decoding/format converting section 520 for decoding the received image signal and converting the format thereof so as to make it adapted to be displayed on the image display apparatus 400, an image signal memory section 521 for temporarily storing the received image signals for the purpose of decoding or format conversion, an image signal processing section 522 for regulating and improving the quality of the received image in terms of contrast, sharpness and so on for the image display apparatus 400 and performing operations of displaying characters on an on-screen display basis, an image signal transmitting section 523 for transmitting the processed image signal to the image display apparatus 400 and a CPU 519 for controlling the operation of the STB 500 main body.

The CPU 519 by turn comprises an identifying information acquiring section for extracting the information for identifying the PCs 300, 300' out of the image signals received by the communication section 516, a display area information acquiring section 526 for obtaining the display coordinates and the display magnification from the image signal received by the communication section 516 and a replacement information generating section 527 for generating data necessary for the image replacing operation of the data replacing section 517.

Furthermore, the STB 500 comprises a connection line 525b connecting the data replacing section 511 and the decoding/format converting section 520, a connection line 525e connecting the decoding/format converting section 520 and the image signal memory section 521, a connection line 525c connecting the decoding/format converting section 520 and the image signal processing section 522, a connection line 525d connecting the image signal processing section 522 and the image signal transmitting section 523 and a data bus 525a connecting the CPU 519 and the sections 522 through 524 and 528 through 531.

(Operation)

Figure 9:
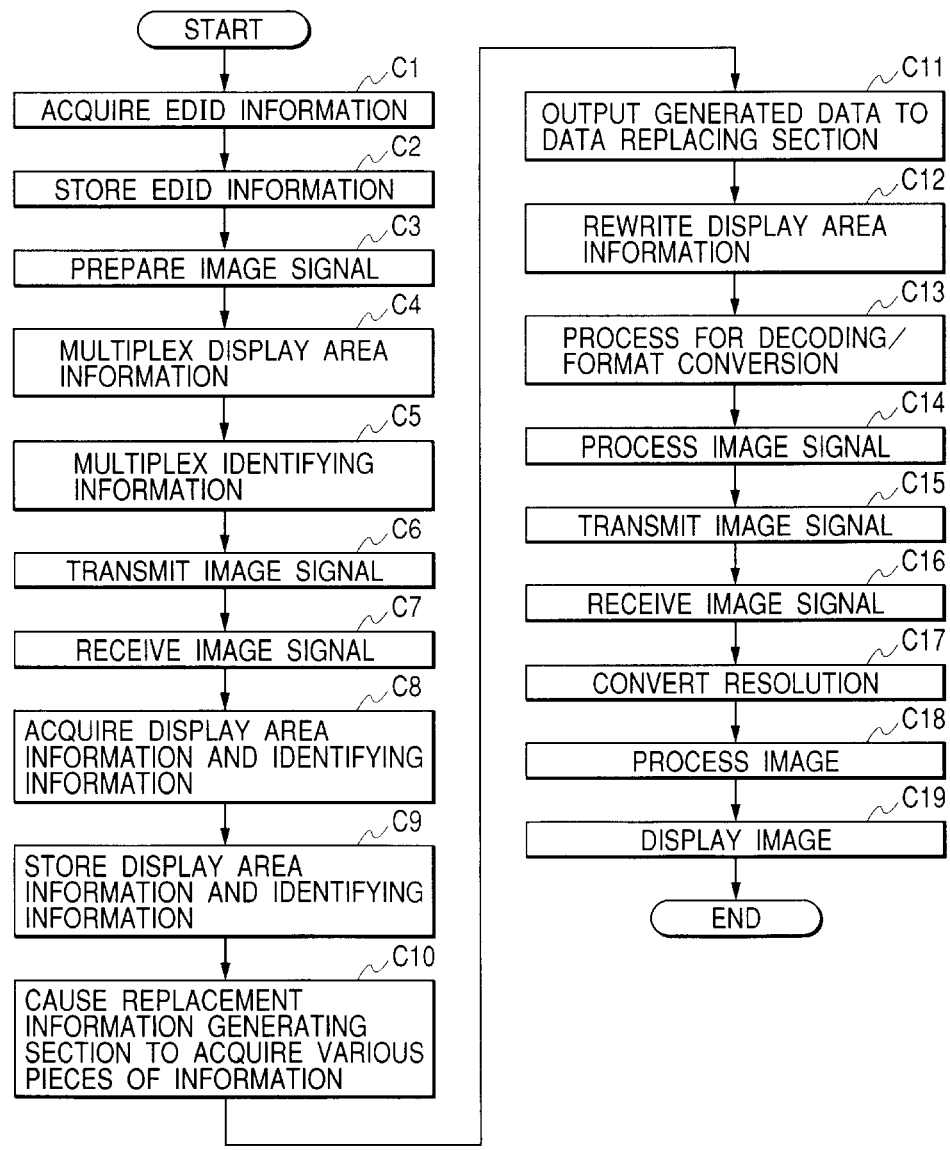
FIG. 9 is a flow chart of the operation of the image display system shown in FIGS. 8A and 8B.
Figure 10:
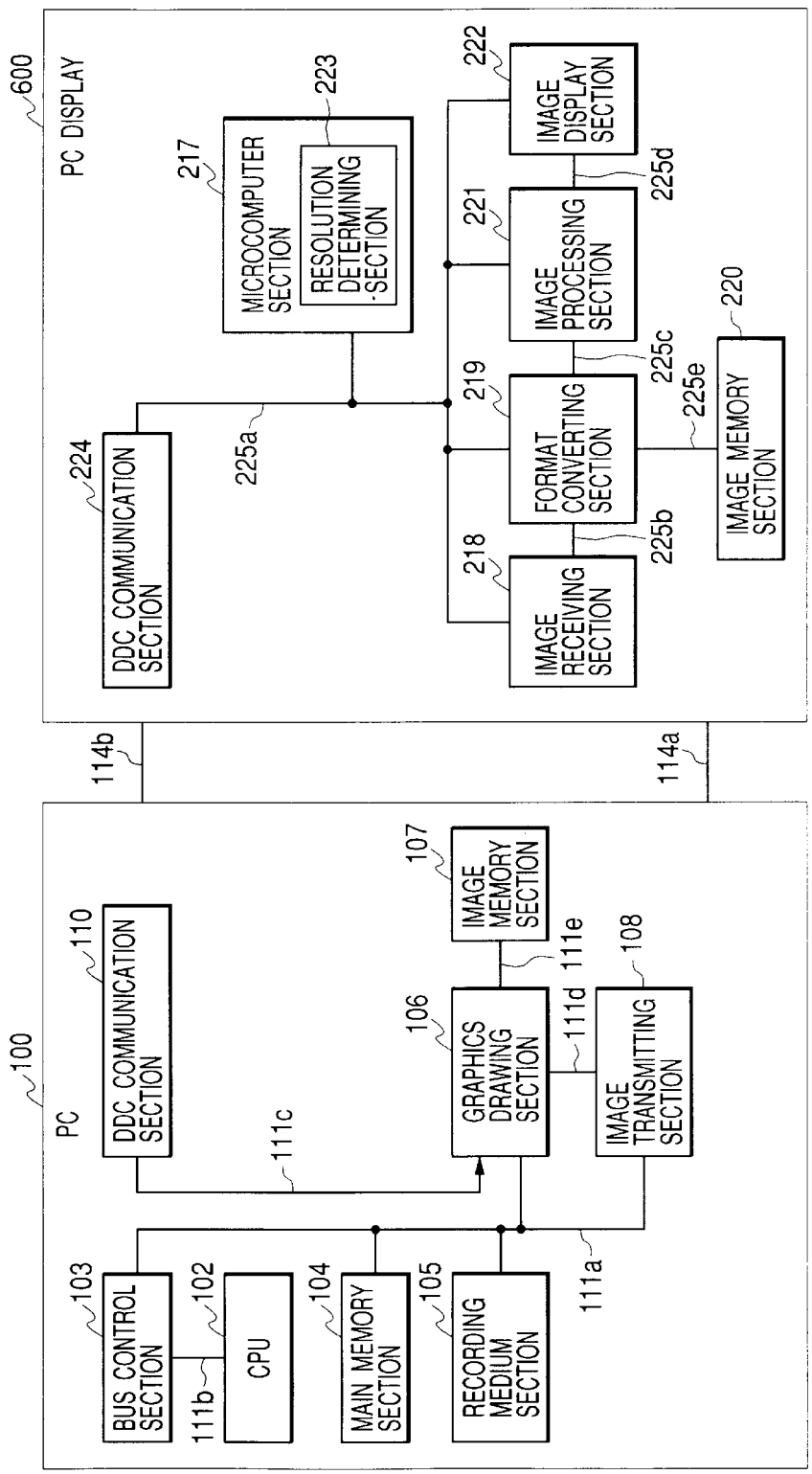
FIG. 10 is a schematic block diagram of a known image display system, illustrating its internal configuration.
Figure 11:
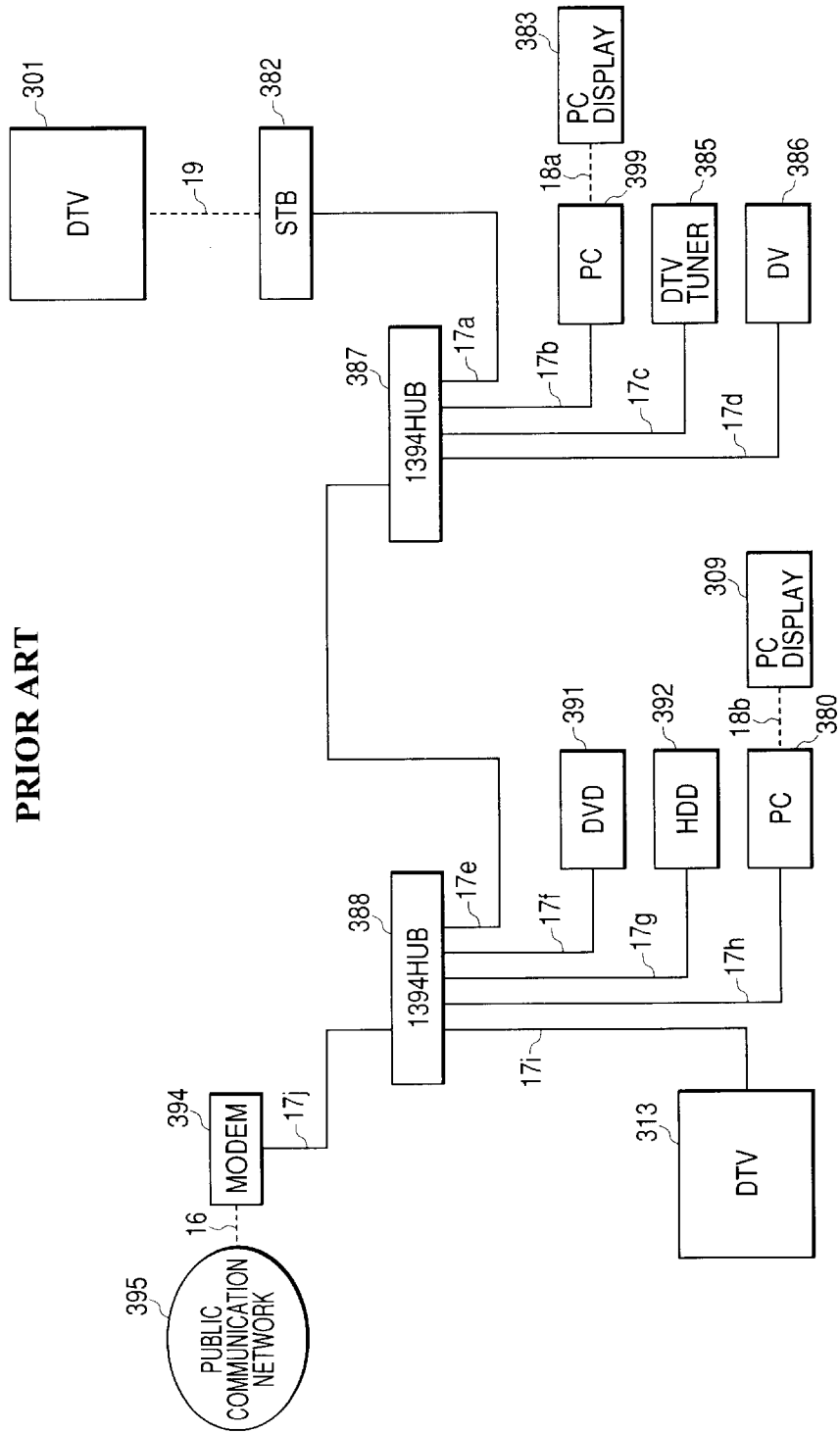
FIG. 11 is a schematic block diagram of a system including the image display system of FIG. 10 and other electric devices.

Table 2 shown hereinafter illustrates the various conditions specified in the image display system and some of the results obtained as a result of the computation operation of the replacement information generating section 527 of the STB 500. FIG. 9 is a flow chart of the operation of the image display system shown in FIGS. 8A and 8B.

Table 2 shows display area information including the resolution, the display magnification and the display position, the EDID information of the image display apparatus 400, the switching information input from the image switching section 531, the display resolution obtained by multiplying the resolution by the display magnification and the coordinates of the overlapping area f14.

More specifically, the image information for the image f1 sent from the PC 300 includes the resolution of XGA (1024×768), the display magnification of 1, the display area of a rectangular parallelepiped with a diagonal defined by the coordinates of (0, 0) and (1023, 767.) On the other hand, the image information for the image f2 sent from the PC 300' includes the resolution of HD720P (1280×720), the display magnification of 1, the display area of a rectangular parallelepiped with a diagonal defined by the coordinates of (0, 0) and (1279, 719). The EDID information of the image display apparatus 400 includes the resolution of QXGA (2048, 1536). Switching information for displaying the image f1 in front of the image f2 is also provided. Note that it is assumed here that the image to be displayed in front of the other is fixed in position and the image to be display behind the other is moved.

TABLE 2

| | Conditions and results of computation | |
|---|---|---|
| | PC 300 | PC 300' |
| Display area | | |
| Resolution | XGA (1024 × 768) | HP720P (1260 × 720) |
| Display magnification | 1.0 | 1.0 |
| Display position | box with a diagonal defined by (0, 0), (1023, 767) | box with a diagonal defined by (0, 0), (1279, 719) |
| EDID information | resolution QXGA (2048 × 1536) | |
| Switching information | front side | rear side |
| Display rosolutlon | 1024 × 768 | 1280 × 720 |
| Overlapping area | box with a diagonal defined by (0, 0), (1023, 719) | |
| Switching information | to be fixed | to be moved |

Now, the operation of the image display system of FIGS. 8A and 8B will be described in terms of the conditions listed in Table 2 above by referring to the flow chart of FIG. 9.

Firstly, the PCs 300, 300' acquire the EDID information and the attribute information on the image display apparatus 400 by way of the STB 500 (Step C1). More specifically, for instance, as the image display apparatus 400 and the STB 500 are connected to each other, the EDID information is transmitted from the image display apparatus 400 to the STB 500 by way of the DDC communication sections 536, 524 and stored in the EDID information memory section 528.

As the PCs 300, 300' are connected to the STB 500 under this condition, the EDID information stored in the EDID memory section 528 is transmitted to the PCs 300, 300' by way of the communication sections 516, 319, 319' and stored in the EDID information memory sections 310, 310' (Step C2).

Then, according to the instructions output from the image control sections 311, 311', the graphics drawing sections 306, 306' generate image signals representing the images to be displayed on the display screen of the image display section 541 of the image display apparatus 400 (Step C3). Subsequently, the generated image signals are output to the respective data buses 311a, 311a'.

Then, the display area information generating sections 312, 312' generate display area information typically on the basis of the display coordinates and the magnifications specified by the user and multiplex the information and the image signals (Step C4). Furthermore, the identifying information multiplexing sections 314, 314' multiplex the respective pieces of identifying information assigned to the PCs 300, 300' and the signals themselves with the respective pieces of image information (Step C5).

Subsequently, the communication sections 319, 319' output the respective image signals multiplexed with various pieces of information to the transmission line 545 in order to transmit them to the image display apparatus 400 (Step C6). The image signals are then received by the communication section 516 of the STB 500 (Step C7). The received image signals are output to the data bus 525a.

The display area information acquiring section 526 and the identifying information acquiring section 525 respectively acquire the display area information and the identifying information from the image signals output from the data bus 525a (Step C8) and store them in the acquired information memory section 530 by way of the data bus 525a (Step C9).

Thereafter, the acquired information memory section 530 is triggered to operate as it receives these pieces of information and outputs the pieces of information it stores to the replacement information generating section 527 by way of the data bus 525a.

Upon receiving the pieces of information from the acquired information memory section 530, the replacement information generating section 527 acquires the EDID information from the EDID information memory section 528 and also the switch information from the switch information memory section 529 by way of the data bus 525a (Step C10) and computationally determines which of the images f1 and f2 is to be moved to eliminate the overlapping area f14 by shifting the coordinates thereof on the basis of all the pieces of information it acquired.

Then, the replacement information generating section 527 defines the coordinate values of the points f8, f12, f3 of the images f1 and f2 on the basis of the display area information stored in the acquired information memory section 530 and also specifically determines that the image f2 shown in FIG. 7A is to be moved on the basis of the switch information stored in the switch information memory section 529.

Then, it concludes that the images f1 and f2 are overlapping on the basis of the points f8, f12 and f3 and then the overlapping area f14 is a box with a diagonal defined by a point (1023, 719), or the X-coordinate of the point f12 and the Y-coordinate of the point f3, and the point f8 (0, 0).

Additionally, the replacement information generating section 527 computationally determines that the sum of the X component of the image f1 and that of the image f2 is less than the width of the display screen of the image display section 541 in the X-direction, or 2047, or the sum of the Y component of the image f1 and that of the image f2 is less than the height of the display screen of the image display section 541 in the Y-direction, or 1535. If the above requirements are met, it generates information necessary for moving the point f3 of the image f2 to the point f10, for example. Because the requirements are actually met as seen from Table 2, it generates information necessary for moving the point f3 of the image f2 to the point f10.

If, on the other hand, the above requirements are not met, the images f1 and f2 cannot avoid producing an overlapping area if the image f2 is moved horizontally and vertically within the display screen of the image display section 541. Therefore, the replacement information generating section 527 typically generates information necessary for modifying the display magnification of the image f2. More specifically, it generates information necessary for reducing the display magnification of the image f2 in such a way that the sum of the X component of the image f1 and that of the dimensionally reduced image f2 does not exceed the width of the display screen of the image display section 541 in the X-direction, or 2047, or the sum of the Y-component of the image f1 and that of the dimensionally reduced image f2 does not exceed the height of the display screen of the image display section 541 in the Y-direction, or 1535.

Then, the replacement information generating section 527 outputs the information it generates to the data replacing section 517 by way of the data bus 525a (Step C11). Then, the data replacing section 517 rewrites the display area information multiplexed with the image signals output from the communication section 516 so as to move the point f3 of the image f2 to the point f10 according to the replacement information from the replacement information generating section 527 (Step C12).

The image signals are output to the decoding/format converting section 520 by way of the connection line 525b. The decoding/format converting section 520 decodes the image signals, using the image signal memory section 521, and converts the format of each of the image signals in terms of resolution and frame frequency so that the image signals may be adapted to the number of display pixels of the image display section 222 (Step C13).

After being subjected to the operation of converting the format, the image signals are output to the image signal processing section 522 by way of the connection line 525c. The image signal processing section 522 regulates and improves the quality of the image signals in terms of contrast, sharpness and so on of the images for the image display apparatus 400 and performs operations of displaying characters on an on-screen display basis (Step C14).

The processed image signals are then output to the image signal transmitting section 523 by way of the connection line 525d. Upon receiving the image signals, the image signal transmitting section 523 multiplexes them and the rewritten display area information stored in the acquired information memory section 530 and transmits them to the image display apparatus 400 by way of the connection line 547 (Step C15).

The image signals are then received by the image receiving section 537 of the image display apparatus 400 (Step C16) and then output to the resolution converting section 538. The resolution converting section 538 converts the resolution and the frame frequency of the received image signals, using the image memory section 539, in order to make them adapted to the number of display pixels of the image display section 541 of the image display apparatus 400 (Step C17) and outputs the image signals to the image processing section 540.

The image processing section 540 performs operations of converting the gamma characters and the color characters of the received image signals in order to display the images with a converted resolution and those of displaying characters on an on-screen display basis (Step C18). The microcomputer section 535 causes the image processing section 540 to display the images represented by the image signals according to the rewritten display area information that is multiplexed with the image signals (Step C19).

Like the first embodiment, this embodiment of image display system can be connected to a Communication network as shown in FIG. 6. It will be appreciated that the PCs 300, 300', the image display apparatus 400 and the STB 500 of this embodiment correspond respectively to the components 384, 390, 381 and 382 in FIG. 6.

While each of the above embodiments is described above from the viewpoint of displaying a plurality of images on the entire display screen of the image display apparatus 200 or 400, the images from a plurality of image signal sources may be optimally displayed when a plurality of display channels and display windows are used as virtual display area expanding beyond the physical display area of the display screen of the image display section 222 of the image display apparatus for displaying the images.

Additionally, while each of the above embodiments is described above in terms of PCs 100, 100' or 300, 300' each being adapted to transmit a single image signal representing an image to the image display apparatus 200 or 400, it may alternatively be adapted to transmit two or more than two image signals. Then, each of the image signals will be multiplexed with the identifying information specific to the signal by the identifying information multiplexing section 116 or 116' whichever appropriate.

As described above in detail, according to the invention, the image display apparatus can edit the pieces of image signal information input to it from a plurality of signal sources by way of a communication network. More specifically, when image signals are input from a plurality of signal sources in such a way that the images represented by the image signals are to be displayed in an overlapping manner unless the image signals are edited in some way or another, the part of the image hidden by the other image may be selectively masked or the former image may be moved to a position where such overlapping does not take place. Thus, according to the invention, since the part of an image hidden by some other image may be selectively masked when it is determined that the two images overlap each other on the basis of the display area information transmitted from each of the plurality of image signal sources, the images represented by the image signals from a plurality of image signal sources connected to a common image display apparatus can be displayed on the single display screen of the image display apparatus without any problems such as overlapping images.

What is claimed is:

1. An image display system comprising:
    a plurality of image signal sources adapted to respectively transmit image signals and pieces of display area information specifying display areas of respective images represented by the image signals; and
    an image display apparatus adapted to display the images on a display section thereof according to the transmitted pieces of display area information, said image display apparatus comprising:
  a determining section for determining a presence or an absence of an overlapping area on the display section based on the pieces of display area information transmitted from said plurality of image signal sources; and
  an erasing section for erasing an image signal of a part of an image to be displayed behind another image for an overlapping area as determined to exist by the determining section,
wherein each of said plurality of image signal sources comprises a display information generating section for generating the pieces of display area information based on attribute information of the display section transmitted from said image display apparatus.

2. An image display system according to claim 1,
wherein each of the image signals is multiplexed with an identification number specific to it for identifying that image signal,
wherein said system further comprises:
  a requesting section adapted to issue a request for retransmitting the image signal for the erased overlapping area of the part of the image displayed behind the other image to a signal source with an identification number of the image signal upon receiving an input from a user commanding to switch the image displayed in front and the image displayed behind or to move a display area of either the image displayed in front or the image displayed behind, and
wherein said system is adapted to cause the display section to display at least a part of the image having the overlapping area represented by an image signal retransmitted in response to the request.

3. An image display system according to claim 2, further comprising a memory section for storing the image signal erased by said erasing section, wherein said image display system is adapted to read at least a part of image signal from said memory section and to cause the display section to display a part of the image represented by the image signal upon receiving an input from the user commanding to switch the image displayed in front and the image displayed behind or to move a display area of either the image displayed in front or the image displayed behind.

4. An image display system according to claim 3, wherein at least one of said erasing section, said requesting section, and said memory section is provided with a set top box arranged between said plurality of image signal sources and said image display apparatus.

5. An image display system according to claim 1, further comprising an image processing section arranged between the erasing section and the display section, the image processing section being adapted to process the image signal erased by the erasing section.

6. An image display system according to claim 1, wherein the pieces of display area information include at least coordinates of points in a virtual coordinate system on the display section, and a presence or an absence of an overlapping area is determined based on the coordinates of the points.

7. An image display system comprising:
  a plurality of image signal sources adapted to respectively transmit image signals and pieces of display area information specifying display areas of respective images represented by the image signals; and
  an image display apparatus adapted to display the images on a display section thereof according to the transmitted pieces of display area information, said image display apparatus comprising:
    a determining section for determining a presence or an absence of an overlapping area on the display section based on the pieces of display area information transmitted from said plurality of image signal sources; and
    a processing section for processing a piece of display area information of the image to be overlapping so as to eliminate an overlapping area as determined to exist by the determining section and to display the images without overlapping,
  wherein each of said plurality of image signal sources comprises a display information generating section for generating the pieces of display area information based on attribute information of the display section transmitted from said image display apparatus.

8. An image display system according to claim 7, further comprising an image processing section arranged between the processing section and the display section, the image processing section being adapted to process an image signal of an image processed according to the piece of display area information.

9. An image display system according to claim 7, wherein the pieces of display area information include at least coordinates of points in a virtual coordinate system on the display section, and a presence or an absence of an overlapping area is determined based on the coordinates of the points.

10. An image display method adapted to receive image signals and pieces of display area information specifying display areas of respective images represented by the image signals transmitted from a plurality of image signal sources by means of an image display apparatus and to display the images on a display section of the image display apparatus according to the respective pieces of display area information, said method comprising:
  a step of transmitting attribute information of the display section from the image display apparatus to the plurality of image signal sources;
  a step of generating the pieces of display area information in the plurality of image signal sources;
  a step of determining a presence or an absence of an overlapping area on the display section based on the pieces of display area information transmitted from the plurality of image signal sources; and
  a step of erasing an image signal of a part of an image to be displayed behind another image for an overlapping area as determined to exist in said step of determining.

11. A recording medium storing a program comprising instructions for causing a computer to execute an image display method according to claim 10.

12. An image display method adapted to receive image signals and pieces of display area information specifying display areas of respective images represented by the image signals transmitted from a plurality of image signal sources by means of an image display apparatus, and to display the images on a display section of the image display apparatus according to the respective pieces of display area information, said method comprising:
  a step of transmitting attribute information of the display section from the image display apparatus to the plurality of image signal sources;
  a step of generating the pieces of display area information in the plurality of image signal sources;
  a step of determining a presence or an absence of an overlapping area on the display section based on the pieces of display area information transmitted from the plurality of image signal sources; and a step of processing a piece of display area information of the images to be overlapping so as to eliminate an overlapping area as determined to exist in said step of determining and to display the images without overlapping.

13. A recording medium storing a program comprising instructions for causing a computer to execute an image display method according to claim 12.

14. An image display apparatus adapted to display a plurality of images on a display screen thereof in an overlapping manner, said apparatus comprising:

an input section for linking said image display apparatus and a plurality of external image signal sources by way of a communication network;

storage means for storing attribute information of the display screen to be sent to the plurality of external image signal sources;

a display area information receiving section for receiving display area information generated in the plurality of external image signal sources based on the attribute information;

a determining section for determining a presence or an absence of an overlapping area of images from any two of the plurality of external image signal sources based on the received display area information before displaying the images on the display screen; and an erasing section for erasing an image signal of a part of an image to be displayed behind another image for an overlapping area as determined to exist by said determining section.

15. An image display apparatus adapted to display a plurality of images on a display screen thereof in an overlapping manner, said apparatus comprising:

an input section for linking said image display apparatus and a plurality of external image signal sources by way of a communication network;

storage means for storing attribute information of the display screen to be sent to the plurality of external image signal sources;

a display area information receiving section for receiving display area information generated in the plurality of external image signal sources based on the attribute information;

a determining section for determining a presence or an absence of an overlapping area of images from any two of the plurality of external image signal sources based on the received display area information before displaying the images on the display screen; and a processing section for processing a piece of image information of the images to be overlapping so as to eliminate an overlapping area as determined to exist by said determining section and to display the images without overlapping.

* * * * *

UNITED STATES PATENT AND TRADEMARK OFFICE
CERTIFICATE OF CORRECTION

PATENT NO. : 6,771,278 B2
DATED : August 3, 2004
INVENTOR(S) : Kazuyuki Shigeta

It is certified that error appears in the above-identified patent and that said Letters Patent is hereby corrected as shown below:

Column 1,
Line 66, "control" should read -- controlling --.

Column 4,
Line 24, "have" should read -- has --.

Column 6,
Line 36, "display" should read -- displaying --.

Column 7,
Line 16, "images" should read -- image --.

Column 12,
Line 3 "HZ" should read -- H2 --.
Line 9, "of the image" (first occurrence) should be deleted.
Line 56, "QXCA" should read -- QXGA --.

Column 14,
Line 31, "converts" should read -- convert --.

Column 17,
Line 39, "performs" should read -- perform --.
Line 56, "(HUBS)" should read -- (HUBs) --.

Column 18,
Line 44, "with" should read -- which --.

Column 20,
Line 21, "300,300" should read -- 300,300' --.
Line 38, "ED ID" should read -- EDID --.

Column 24,
Line 16, "Communication" should read -- communication --.
Line 25, "area" should read -- areas --.

UNITED STATES PATENT AND TRADEMARK OFFICE
CERTIFICATE OF CORRECTION

PATENT NO. : 6,771,278 B2
DATED : August 3, 2004
INVENTOR(S) : Kazuyuki Shigeta

It is certified that error appears in the above-identified patent and that said Letters Patent is hereby corrected as shown below:

Column 25,
Line 37, "of" should read --of the --.

Signed and Sealed this

Twenty-sixth Day of October, 2004

JON W. DUDAS
*Director of the United States Patent and Trademark Office*